US011710071B2

(12) United States Patent
Sen

(10) Patent No.: US 11,710,071 B2
(45) Date of Patent: Jul. 25, 2023

(54) DATA ANALYSIS AND RENDERING

(71) Applicant: STATGRAF Research LLP, Richmond (CA)

(72) Inventor: Prabir Sen, Richmond (CA)

(73) Assignee: STATGRAF RESEARCH

( * ) Notice: Subject to any disclaimer, the term of this patent is extended or adjusted under 35 U.S.C. 154(b) by 176 days.

(21) Appl. No.: 17/231,933

(22) Filed: Apr. 15, 2021

(65) Prior Publication Data
US 2021/0232975 A1     Jul. 29, 2021

Related U.S. Application Data

(63) Continuation of application No. 15/789,216, filed on Oct. 20, 2017, now abandoned.

(51) Int. Cl.
| | |
|---|---|
| *G06F 3/048* | (2013.01) |
| *G06N 20/00* | (2019.01) |
| *G06N 5/022* | (2023.01) |
| *G06N 3/04* | (2023.01) |

(52) U.S. Cl.
CPC ............ *G06N 20/00* (2019.01); *G06N 5/022* (2013.01); *G06N 3/04* (2013.01)

(58) Field of Classification Search
CPC .......... G06N 3/08; G06N 7/005; G06N 3/088; G06N 5/04; G06N 3/0454; G06N 3/02; G06F 17/18; G06F 16/248
See application file for complete search history.

(56) References Cited

U.S. PATENT DOCUMENTS

| | | | | |
|---|---|---|---|---|
| 5,133,021 | A | * | 7/1992 | Carpenter ............ G06N 3/0409 382/209 |
| 5,359,183 | A | | 10/1994 | Skodlar |
| 5,884,271 | A | | 3/1999 | Pitroda |
| 5,995,077 | A | | 11/1999 | Wilcox et al. |
| 6,019,284 | A | | 2/2000 | Freeman et al. |
| 6,047,277 | A | * | 4/2000 | Parry .................... G06F 40/279 706/14 |

(Continued)

OTHER PUBLICATIONS

Golosio et. al. "A cognitive neural architecture able to learn and communicate through natural language", 2015, pp. 1-79; https://arxiv.org/ftp/arxiv/papers/1506/1506.03229.pdf (Year: 2015).*

(Continued)

*Primary Examiner* — Steven B Theriault

(57) ABSTRACT

A data analysis system includes processor to: arrange data in a multi-dimensional structure based on a target activity defined by a smart card; perform analysis on the data to predict an outcome of the target activity of activities; determine a probability of success of the outcome that has been predicted; determine, based on the outcome and probability of success, choices associated with the activities; determine patterns and changes in the data pertaining to the activities detected by an access device with access to the smart card; perform transformative and scheduling, exposed through an application programming interface for the data; schedule to arrange the choices and the probability of success of the outcome for the access device; cue the choices and the probably of success; and transmit the plurality of choices and the probability of success of the outcome to the access device for rendering on the smart card.

19 Claims, 17 Drawing Sheets

(56) References Cited

U.S. PATENT DOCUMENTS

| | | | |
|---|---|---|---|
| 6,068,183 A | 5/2000 | Freeman et al. | |
| 6,118,986 A | 9/2000 | Harris et al. | |
| 6,902,115 B2 | 6/2005 | Graf et al. | |
| 7,044,368 B1 | 5/2006 | Barron | |
| 7,097,108 B2 | 8/2006 | Zellner et al. | |
| 7,270,276 B2 | 9/2007 | Vayssiere | |
| 7,357,331 B2 | 4/2008 | Blossom | |
| 7,503,504 B2 | 3/2009 | Mitra | |
| 7,975,927 B1 | 7/2011 | Whitney | |
| 8,464,938 B2 | 6/2013 | Briscoe et al. | |
| 8,594,730 B2 | 11/2013 | Bona et al. | |
| 8,671,055 B2 | 3/2014 | Spodak et al. | |
| 8,950,680 B2 | 2/2015 | Yuzon et al. | |
| 9,317,675 B2 | 4/2016 | Suwald | |
| 9,443,192 B1* | 9/2016 | Cosic | G06N 3/006 |
| 9,491,879 B2 | 11/2016 | Cheng et al. | |
| 9,576,285 B2 | 2/2017 | Zhou | |
| 9,727,813 B2* | 8/2017 | Mullen | G06K 7/084 |
| 9,740,368 B1* | 8/2017 | Love | G06F 3/04817 |
| 9,798,965 B2 | 10/2017 | Yisraelian et al. | |
| 9,904,949 B1* | 2/2018 | Tavernier | G06Q 30/0631 |
| 10,026,078 B1 | 7/2018 | Nolan | |
| 10,055,926 B2 | 8/2018 | Campero et al. | |
| 10,108,701 B2* | 10/2018 | Saarinen | G06V 10/768 |
| 10,127,596 B1* | 11/2018 | Franke | G06Q 30/0631 |
| 10,198,687 B2 | 2/2019 | Mullen et al. | |
| 10,354,184 B1* | 7/2019 | Vitaladevuni | G06Q 30/0255 |
| 10,452,974 B1* | 10/2019 | Cosic | G06N 5/022 |
| 10,504,105 B2* | 12/2019 | Mullen | G06F 3/0416 |
| 10,529,018 B1* | 1/2020 | Liu | G06N 20/00 |
| 10,592,822 B1* | 3/2020 | Cosic | G06N 20/00 |
| 10,990,253 B1* | 4/2021 | Krishnamoorthy | G06F 16/954 |
| 11,069,001 B1* | 7/2021 | Mascaro | G06Q 40/123 |
| 11,126,997 B1* | 9/2021 | Ripple | G06Q 20/341 |
| 11,222,453 B1* | 1/2022 | Aupetit | G06F 3/0486 |
| 11,294,784 B1* | 4/2022 | Bergman | G06N 20/00 |
| 11,354,555 B1* | 6/2022 | Yee | G06K 19/0709 |
| 11,361,302 B2* | 6/2022 | Rule | H04W 12/06 |
| 2002/0099675 A1* | 7/2002 | Agrafiotis | G06N 3/02 706/15 |
| 2002/0161655 A1* | 10/2002 | Bredin | G06Q 20/363 705/26.8 |
| 2002/0195493 A1* | 12/2002 | Dell | G07F 7/1008 235/451 |
| 2003/0220876 A1 | 11/2003 | Burger et al. | |
| 2004/0117514 A1 | 6/2004 | Nelms et al. | |
| 2005/0108096 A1* | 5/2005 | Burger | G06Q 20/341 705/14.38 |
| 2005/0131792 A1 | 6/2005 | Rowe | |
| 2005/0211784 A1 | 9/2005 | Justin | |
| 2006/0091202 A1 | 5/2006 | McInnis | |
| 2006/0112347 A1* | 5/2006 | Baudisch | G06F 3/0481 715/764 |
| 2007/0073619 A1 | 3/2007 | Smith | |
| 2007/9175983 | 8/2007 | Klug | |
| 2008/0149734 A1* | 6/2008 | Musial | G06K 19/07309 235/492 |
| 2008/0163247 A1* | 7/2008 | Musial | G07F 7/082 719/313 |
| 2008/0214210 A1* | 9/2008 | Rasanen | H04W 4/029 455/456.3 |
| 2008/0299860 A1 | 12/2008 | Lee et al. | |
| 2008/0314994 A1* | 12/2008 | Faith | G06Q 20/367 439/55 |
| 2009/0037275 A1 | 2/2009 | Pollio | |
| 2009/0042619 A1* | 2/2009 | Pierce | G06F 3/0237 455/566 |
| 2009/0212909 A1* | 8/2009 | Burger | G06Q 20/341 340/10.4 |
| 2009/0277958 A1 | 11/2009 | Lobo | |
| 2010/0299596 A1* | 11/2010 | Zalewski | G06F 3/04186 345/173 |
| 2011/0316723 A1* | 12/2011 | Wohlert | G06Q 10/10 341/20 |
| 2012/0053986 A1* | 3/2012 | Cardno | G06F 16/285 705/7.29 |
| 2013/0015949 A1 | 1/2013 | Yu et al. | |
| 2013/0080238 A1 | 3/2013 | Kelly et al. | |
| 2013/0080890 A1* | 3/2013 | Krishnamurthi | G06F 3/0482 715/702 |
| 2013/0097158 A1* | 4/2013 | Pobbathi | G06F 16/9535 707/723 |
| 2013/0212542 A1* | 8/2013 | Baughman | G06F 3/04883 715/866 |
| 2013/0232082 A1* | 9/2013 | Krawczewicz | G16H 10/60 705/55 |
| 2013/0248607 A1 | 9/2013 | Zlotnik | |
| 2014/0021252 A1 | 1/2014 | Brennan | |
| 2014/0115466 A1* | 4/2014 | Barak | G06F 9/451 715/765 |
| 2014/0289844 A1* | 9/2014 | Suwald | G06K 19/0719 726/20 |
| 2014/0303839 A1* | 10/2014 | Filev | G06F 3/0481 701/36 |
| 2014/0316581 A1* | 10/2014 | Fadell | F24F 11/30 700/276 |
| 2015/0058337 A1* | 2/2015 | Gordon | G06N 7/005 707/769 |
| 2015/0278908 A1* | 10/2015 | Nice | G06Q 30/0631 705/26.7 |
| 2015/0294210 A1 | 10/2015 | Martinez de Velasco Cortina et al. | |
| 2015/0324789 A1 | 11/2015 | Dvorak et al. | |
| 2016/0005097 A1* | 1/2016 | Hsiao | G06Q 30/0631 705/26.7 |
| 2016/0062603 A1* | 3/2016 | Halbedel | G06N 20/00 715/762 |
| 2016/0164866 A1* | 6/2016 | Oberheide | H04L 63/0853 726/1 |
| 2016/0259491 A1* | 9/2016 | Jacobs | G06F 3/0488 |
| 2016/0292158 A1* | 10/2016 | Todd | G06F 16/285 |
| 2016/0360382 A1* | 12/2016 | Gross | G06F 9/453 |
| 2017/0094486 A1 | 3/2017 | Todasco | |
| 2017/0178115 A1 | 6/2017 | Todasco | |
| 2017/0185232 A1* | 6/2017 | Schreiber | G06F 3/017 |
| 2017/0213119 A1* | 7/2017 | Bae | G06K 19/07709 |
| 2017/0344209 A1* | 11/2017 | Gordon | G06F 3/013 |
| 2018/0036882 A1* | 2/2018 | Kimura | B25J 9/1664 |
| 2018/0174070 A1* | 6/2018 | Hoffman | G06Q 30/0277 |
| 2018/0311572 A1* | 11/2018 | Pickover | A63F 13/216 |
| 2019/0310743 A1* | 10/2019 | Yamashita | G06F 3/0482 |

OTHER PUBLICATIONS

Bayro-Corrochano et. al. "a new self organizing neural network using geometric algebra", Computer Science Institute, Cognitive Systems Group, Christian-Albrechts University, Kiel, Germany; IEEE, 1996. (Year: 1996).*

* cited by examiner

DATA ANALYSIS AND RENDERING

REFERENCE TO EARLIER FILED APPLICATION

This application is continuation of Ser. No. 15/789,216, filed Oct. 20, 2017, which is incorporated herein by this reference in its entirety.

TECHNICAL FIELD

The present subject matter relates generally to data analysis and, more specifically, to data analysis and rendering in smart cards.

BACKGROUND

Generally, location-specific mobile applications provide services based on past activities and preferences of an individual. For example, many applications available for mobile devices provide information based on a location of the mobile device, such as purchasing a product at a shopping mall. Some of these applications may consider user preferences or historical patterns provided by an individual with a set of pre-defined rules. Most often the information provided by these applications is designed to help or aid the individual based on the pre-defined rules. Therefore, such applications are said to be designed as "aided-to-aid".

However, the pre-defined rules may change dynamically based on any change in activities and/or cognitive state of the individual. Moreover, in absence of any pre-defined rules, i.e., in case of real-life conditions, information available may not always be complete. In such conditions, such applications have very limited use for decision-making. Specifically, the applications may be unable to structure information in a way that can be presented in a relevant and meaningful manner. As a result, these applications may rely upon already known information or pre-defined rules. However, the pre-defined rules provide information that is generally not aligned to a cognitive process and, therefore, may have very limited value to the individual.

SUMMARY OF THE DISCLOSURE

This summary is provided to introduce a selection of concepts in a simplified form that are further described below in the detailed description section. This summary is not intended to identify key features or essential features of the claimed subject matter, nor is it intended to be used to limit the scope of the claimed subject matter.

In an implementation of the present subject matter, a data analysis system is described. The data analysis system includes a processor, a latent learner coupled to the processor, an inference deducer coupled to the processor, and a probability determiner coupled to the processor. The latent learner is to arrange data in a multi-dimensional structure based on a target activity defined by an individual. The data pertains to one of a current activity and a target activity of the individual. Further, the inference deducer is to perform analysis on the data arranged in the multi-dimensional structure to predict an outcome. The inference deducer employs a proactive-retroactive learning technique to deduce the outcome. Furthermore, the probability determiner is to determine a probability of success of the outcome. Based on the outcome and the probability of success of the outcome, a plurality of choices is generated and rendered on a smart card.

In another implementation of the present subject matter, a method for prescribing an action in response to a current activity of an individual is disclosed. The method includes receiving, by a processor, data pertaining to the activity of a plurality of individuals. The data comprising a time and a geographic location of the plurality of individuals while performing the activity. The method further includes arranging the data in a multi-layered multi-dimensional structure based on a self-organized cognitive algebraic neural network (SCANN) technique. The method includes, based on the arranging, aggregating the data for each individual from the plurality of individuals into multiple groups. The aggregation is based on historic transactions performed by the plurality of individuals. Upon grouping each individual, the method includes determining a plurality of choices for the individual based on the current activity and predictions for a group for which the individual is a member. The plurality of choices includes choices associated with actions for the current activity of the individual. In addition, the method includes ranking the plurality of choices in a sequential order before transmitting the plurality of choices to at least one of a smart card and an access device to render the plurality of choices to the individual.

In an implementation of the present subject matter, a non-transitory computer readable medium is disclosed. The non-transitory computer readable medium including machine readable instructions that are executable by a computer processor to receive data pertaining to a current activity of an individual. The data includes activity content, time, and a geographic location of the individual. Further, the instructions when executed cause the processor to determine the current activity of the individual based on a prediction performed on the data. The instructions when executed also cause the processor to identify a plurality of choices for the individual based on the current activity and predictions for a group of individuals for which the individual is a member. The plurality of choices includes choices associated with an action for the current activity of the individual. Furthermore, the instructions when executed cause the processor to transmit the plurality of choices to one of a smart card and an access device over a network to present the plurality of choices to the individual.

In an implementation of the present subject matter, a smart card is disclosed. The smart card includes a front panel having a display unit and a rear panel having a glass cover. The smart card further includes a printed circuit board sandwiched between the front panel and the rear panel. The printed circuit board includes a processor and at least one application program executed by the processor to communicate with an access device. The access device transmits data pertaining to an activity of the individual having the smart card to a computing device and receives a data set from the computing device for being rendered on the smart card.

In yet another implementation of the present subject matter, a method of displaying data on a smart card is disclosed. The method includes sharing data pertaining to a current activity of an individual with a computing system. The method further includes receiving analyzed data from the computing system. The analyzed data comprises a plurality of choices with respect to a probable outcome based on the current activity of the individual. Further, the method includes displaying the received analyzed data through a display unit of the smart card for the individual carrying the smart card.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following detailed description, which is to be read in association with the accompanying drawings, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments. In addition, the embodiments may follow privacy, security and anonymity for analyzing data without limitation to these specific details. Furthermore, different embodiments are described below, and may be used or performed together in different combinations.

According to an embodiment, a data analysis system is operable to autonomously arrange data in a cognitive structure, process the data to determine a state, action, expected response, and/or reward for a plurality of choices. The data analysis system may further present the plurality of choices to aid an individual activity based on information related to activities and trajectories using multiple sources of dynamic (im)perfect and (in)complete data. In addition, the data analysis system may apply advanced analytics and machine learning techniques in real-time to formulate probabilities, determine latent causal variables, derive inferences and lead possibilities to display on the smart card for adaptive decisions.

Entities may respond to these predictions to 'manage probable', recognize deep latent causal variables, anticipate inferences and 'lead the possibilities' with personalized set of choices at a moment in time that is relevant to the individual. Predictions, latent causal variable analyses and inferences for each individual may be aggregated to form a collection of dynamic decisions relevant to the individual, and the collection of dynamic decisions may be used to draw the inferences for the individual.

Figure 1:
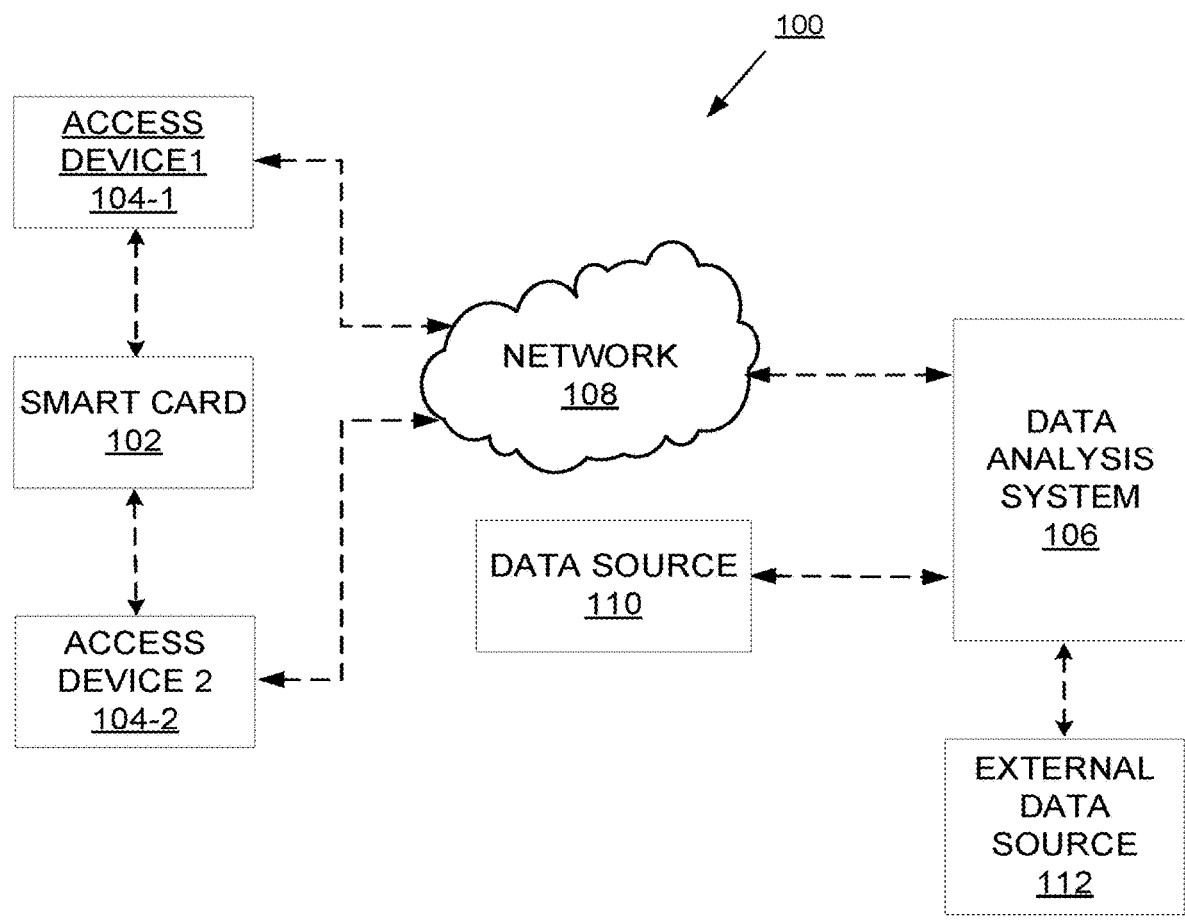
FIG. 1 illustrates a network environment implementing a data analysis system, in accordance with an embodiment of the present subject matter.

FIG. 1 illustrates a network environment 100 implementing a data analysis system 106 (hereinafter referred to as system 106), in accordance with an embodiment of the present subject matter. In the network environment 100, the system 106 is connected to a network 104 and a data source 110, such as a database or other data structures. Though the data source 110 is shown outside the system 106, it may be noted that the data source 110 can be inside the system 106. The system 106 can be implemented as any computing device connected to the network 104. For example, the system 106 may be implemented as personal computers, desktops, laptops, and so on.

Further, the system 106 is connected to one or more smart card 102 through the network 104. In an example, the system 106 may not be directly connected to the smart card 102. The smart card 102 connects with an access device 104-1 or 104-2, which in turn connects with the system 106 over the network 104. The smart card 102 and the access devices 104-1 or 104-2 may be associated with an individual, who may be a subscriber to one or more services (e.g., a wireless telephone service) provided over the network 104. Further, the system 106 may be connected with an external data source 112.

The smart card 102 may use an application to connect with the access device 104-1 or 104-2 that includes applications for various other activities such as shopping, commuting, search, detecting condition, detecting health, activating car or a device, accessing remote home security, banking transactions, trading investments, joining events, monitoring time, etc. and applications dynamically detect, use, play and display content such as video, audio, document, map, text, graph, etc. This enables the smart card 102 to use these applications for activity of the individual having the smart card 102.

In an implementation, the smart card 102 may have a dual mode of communication. In a first mode, the smart card 102 is connected to another smart card. In a second mode, the smart card 102 is connected to the access device 104-1 or 104-2 and thereby connects with the data analysis system 106 and external data source 112. In the present implementation, the smart card 102 may use network technologies suitable for teleporting transactional data, such as activity, behavioral and preference data, content, geographic location, etc. Examples of networks may include wireless networks, mobile device networks (e.g., cellular networks), closed media networks, near-field communication networks, Bluetooth networks, subscriber television networks, cable networks, satellite networks, the Internet, intranets, local area networks, public networks, private networks, optical fiber networks, broadband networks, narrowband networks, voice communications networks and any other networks capable of carrying data.

Data may be transmitted between different entities through data transmission protocols including, by way of non-limiting example, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTF"), Individual Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, signaling system seven ("SS7") technologies, Block-chain Protocol technologies, Bit Torrent protocol technologies, Ethernet, in-band and out-of-band signaling technologies, and other suitable networks and protocol technologies.

Data provided from the access devices 104-1 and 104-2 or the external data source 112 may be tagged or carry numerous data including biometric data from the smart card 102 to identify the individual, the access device 104-1 or 104-2, or the external data source 112. In an example, the access device 104-1 or 104-2 may include any device configured to use the smart card 102 to perform one or more of the access device processes described herein, including communicating with the system 106. Further, an access device 104-1 or 104-2 may also include a wireless computing device, a wireless communication device (e.g., a mobile phone), a portable computing device (e.g., a laptop), a portable communication device (e.g., a car navigation), a personal digital assistant (e.g., a tablet), a data reader (e.g., automated teller machine), a radio-frequency communication device (e.g., a parking lot reader), a near-field communication reader (e.g., contactless payment), internet enabled device (e.g. airline kiosks), large screen device (e.g., shopping kiosks), internet enabled appliances (e.g., web-machine), data enabled sensors (e.g., weather sensors), data enabled device (e.g., aircraft engine), network connection device (e.g., router), a digital device (e.g., medical scanner), voice enabled device (e.g., smart speaker), a digital content recording device (e.g., a camera, audio recorder, video camera), a vehicular computing and/or communication device (e.g., a taxi meter), and any other device configured to perform one or more of the smart card processes described herein.

In an example, the access device 104-1 or 104-2 may include devices that may be used for measuring or determining metrics, such as location, traffic sensors, environment sensors for detecting weather condition, sensors for detecting vehicle capacity, sensors for detecting current time, sensors to access doors and buildings, sensors to view images, sensors to monitor movements, sensors to observe gestures, sensors for detecting usage condition, visual sensors, audio sensors, location sensors, and the like.

As mentioned above, the network environment 100 may include the data source 110 that stores data used by the system 106 containing a plurality of choices and aggregates for a group or network, where the individual is a member.

The data source 110, for example, stores transactional data ("transactional data") of the individual includes, but not limited to, data related to an activity ("activity content"), historical data that were used for previous activity ("historical data"), geographic location associated to an activity ("location data"), timestamp and other meta data ("tagged data"), content provided to another individual and the group ("interaction data") and other information such as attributes, features, preferences, etc. ("cognitive data") that may be used for determining the plurality of choices. The data base 106 may include a database system or other type of storage system. The data source 110 may include one or more data storage media, devices, or configurations and may employ any type, form, and combination of storage media. For example, the data source 110 may include a hard drive, network drive, flash drive, magnetic disc, optical disc, random access memory ("RAM"), dynamic RAM ("DRAM"), artificial-intelligence enabled memory, other non-volatile and/or volatile storage unit, or a combination thereof. In an example, data may be temporarily and/or permanently stored in the data source 110.

In an implementation, the network environment 100 facilitates in transmitting data from one smart card to another smart card. For example, each smart card 102 is physically attached and connected the access devices 104-1 and 104-2. The access devices 104-1 and 104-2 may be sensors, including but not limited to mobile sensors, Internet of Things ("IoT") sensors and other data readers. Further, the smart card 102 may be connected to the data analysis system 106. The data analysis system 106 may collect data from other external data sources 112 that may be used for activity, behavioral and preference information of individuals and perform computations to obtain a plurality of choices based on a current activity and a target activity of the individual having the smart card 102. The data analysis system 106 may transmit the plurality of choices to the access device 104-1 or 104-2 with which the smart card 102 is connected such that the plurality of choices may be presented on the smart card 102.

Figure 2:
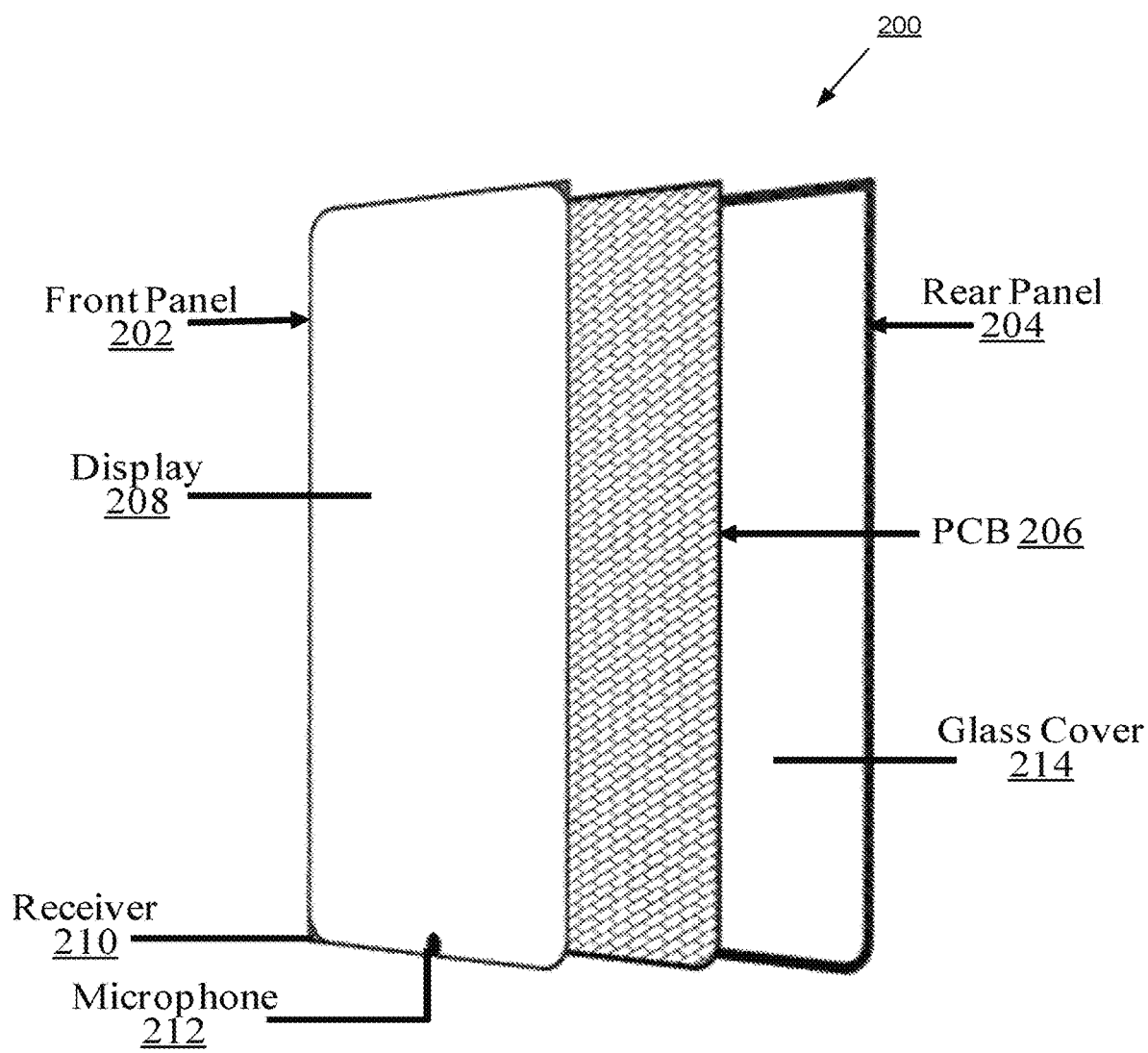
FIG. 2 illustrates a perspective view of a smart card, in accordance with an embodiment of the present subject matter.

FIG. 2 illustrates a perspective view of a smart card 200, in accordance with an embodiment of the present subject matter. The smart card 200 may include additional components not shown and some of the components described may be removed and/or modified. For example, the smart card 200 may represent a hardware interface that runs the system 106 or other components may comprise one of multiple distributed interfaces that performs the functions of the system 100 in a distributed computing environment.

The smart card 200 includes a front panel 202, a rear panel 204, and a printed circuit board (RGB) 206 sandwiched between the front panel 202 and the rear panel 204. In an example, the front panel 202 includes a display unit 208. The display unit 208 may be a screen, touch screen and other types of screen display. The front panel 202 may further include at least one receiver 210 including, but not limited to, audio receivers, transmitters and audio-video codec required for analog, digital and transformation from analog to digital, natural language processing ("NLP") for speech-to-text-to-speech communications, machine-aided human translation processes (MAHT) to translate text or speech from one language to another. In addition, the front panel 202 includes microphones 212 for the individual to enable voice messages including speech synthesis, linguistic representations speech-to-text-to-speech and automated speech recognition.

In an implementation, the rear panel 204 includes a magnetic and optical glass cover 214 (hereinafter referred to as glass cover 214) that includes a glass fabrication with insulation distance between motherboard and contacts, insulation wire, coil power, cadmium free contacts, terminal and surge pitch with safety standards and flux proof sealing.

Figure 3:
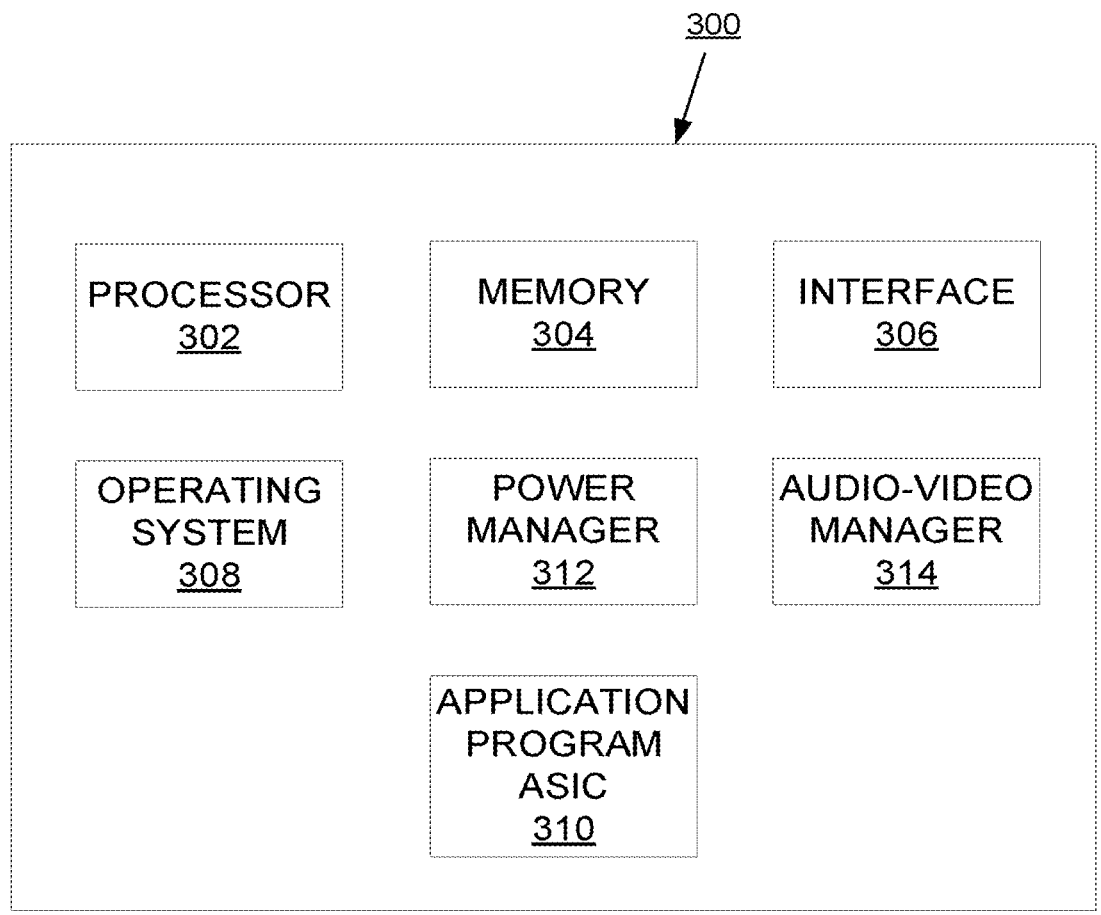
FIG. 3 illustrates a block diagram of a printed circuit board of a smart card, in accordance with an embodiment of the present subject matter.

FIG. 3 illustrates a block diagram of a printed circuit board 300 of a smart card, such as the smart card 102, in accordance with an embodiment of the present subject matter. In an example, the RGB 300 is same as the RGB 206. The RGB 300 includes a processor 302 such as a central processing unit or graphics processing unit or ASIC or other type of processing circuit and a memory 304. The memory 304 stores databases or other data structures for a database, such as the data source 110 as shown in FIG. 1.

The PCB 300 may further include an interface 306 that may include a variety of software and hardware interfaces. The interface 306 may enable the smart card 200 to communicate with other smart cards as well as devices, such as data analysis system 106, and external data repositories, such as the data source 110, in the network environment 100. The interface 306 may include a network interface, such as a Local Area Network (LAN), a wireless 802.11×LAN, a 3G/4G/5G/XG mobile WAN or a WiMax WAN or a LTE WAN. The PCB 300 may also include a display manager (not shown), as a system that controls audio-video for a display.

In an example, the PCB 300 includes a computer-readable medium (not shown) to connect with the smart card 102 and an access device 104-1 or 104-2. The computer readable medium may be any suitable medium, which stores machine readable instructions to be executed by the processor(s) 302. For example, the computer readable medium may be non-transitory and/or non-volatile, such as a magnetic disk or volatile media such as RAM, or pinned memory in which a physical memory page or a code communicates with the application 310 in the access device 104-1 or 104-2. The instructions stored on the computer readable medium may include machine readable instructions executed by the processor(s) 302 to perform the methods and functions related to the data analysis system 106. The computer readable medium may include solid state memory for storing machine readable instructions and/or for storing data temporarily, which may include information from the data repository, for performing system performance analysis.

Further, the computer readable medium may store an operating system 308, such as MAC OS, ANDROID, MS WINDOWS, UNIX, or LINUX, and one or more applications. The operating system 308 may be multi-user, multi-processing, multitasking, multithreading, real-time and the like. The operating system 308 allows communication between hardware and software components of the smart card 102.

In addition, the RGB 300 may include an application 310 embedded in an integrated circuit as ASIC or other type of control operation processing circuit. The application 310 may include application of the access device 104-1 or 104-2. The PCB 300 may also include a connector (not shown) as a device for joining and disjoining electrical circuits for physical near-field contact with the access device 104-1 or 104-2. For example, the connector may be coupled to the access device 104-1 or 104-2 via near-field communications including, but not limited to Touch ID, Optical security, QR Code, Biometrics, etc. and any combination thereof. In addition, the connector facilitates in connecting the smart card 102 with an external data source 112 and the access devices 104-1 and 104-2 via the Internet. The smart card 102 may be connected directly to other smart cards as well as the data analysis system 106 via the same or different network.

Further, the PCB 300 includes a power manager 312 that stores and supplies low voltage electricity. The PCB 300 also includes an audio-video manager 314 that stores and plays audio and visuals on the display. Each of these components may be operatively coupled to the PCB 300.

Figure 4:
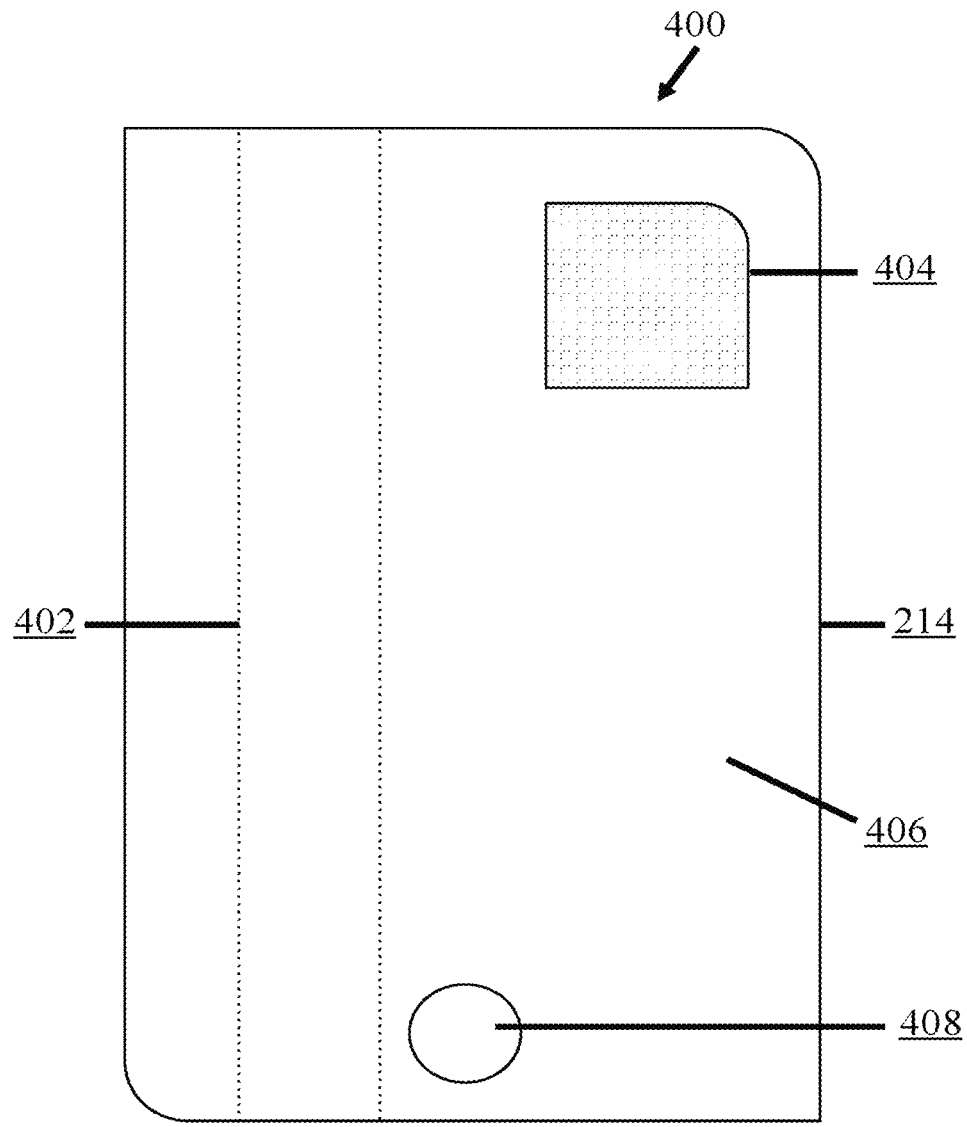
FIG. 4 illustrates a schematic of the rear panel of the smart card, in accordance with an embodiment of the present subject matter.

Referring now to FIG. 4, a schematic of the rear panel 400 of a smart card, such as the smart card 400 is illustrated in accordance with an embodiment of the present subject matter. The rear panel 400 includes a glass cover 214. The glass cover 214 may be magnetic and optical glass cover. Further, the rear panel 400 includes a magnetic strip 402 fabricated thereon. In an example, the magnetic strip 402 is either magnetic paint or one or more piece of sheet metal or one or more piece of laminated rare earth magnets, which are strong enough to reach the steel through the glass cover 214. In addition, the rear panel 400 may include an optical security 404 that may include encryption such as digital holographic encryption in optical technique, which describes encryption using multidimensional digital holography, or compressive sensing encryption, or nano or microscale implementation, or ghost imaging or any combination thereof with image processing algorithms. In an implementation, the rear panel 400 further includes a sensor 406 for touch and gesture. The sensor 406 includes touch and 3D gesture controlled applications, lower-power touch pads, non-touch interaction based on hand gestures for natural user interface. Furthermore, the rear panel 400 includes a touch ID counter 408 that uses one or more digitized finger prints which also provides a confirmation counter for secured transaction, activation, verification, confirmation, etc. for the individual activity and/or target activities.

Figure 5:
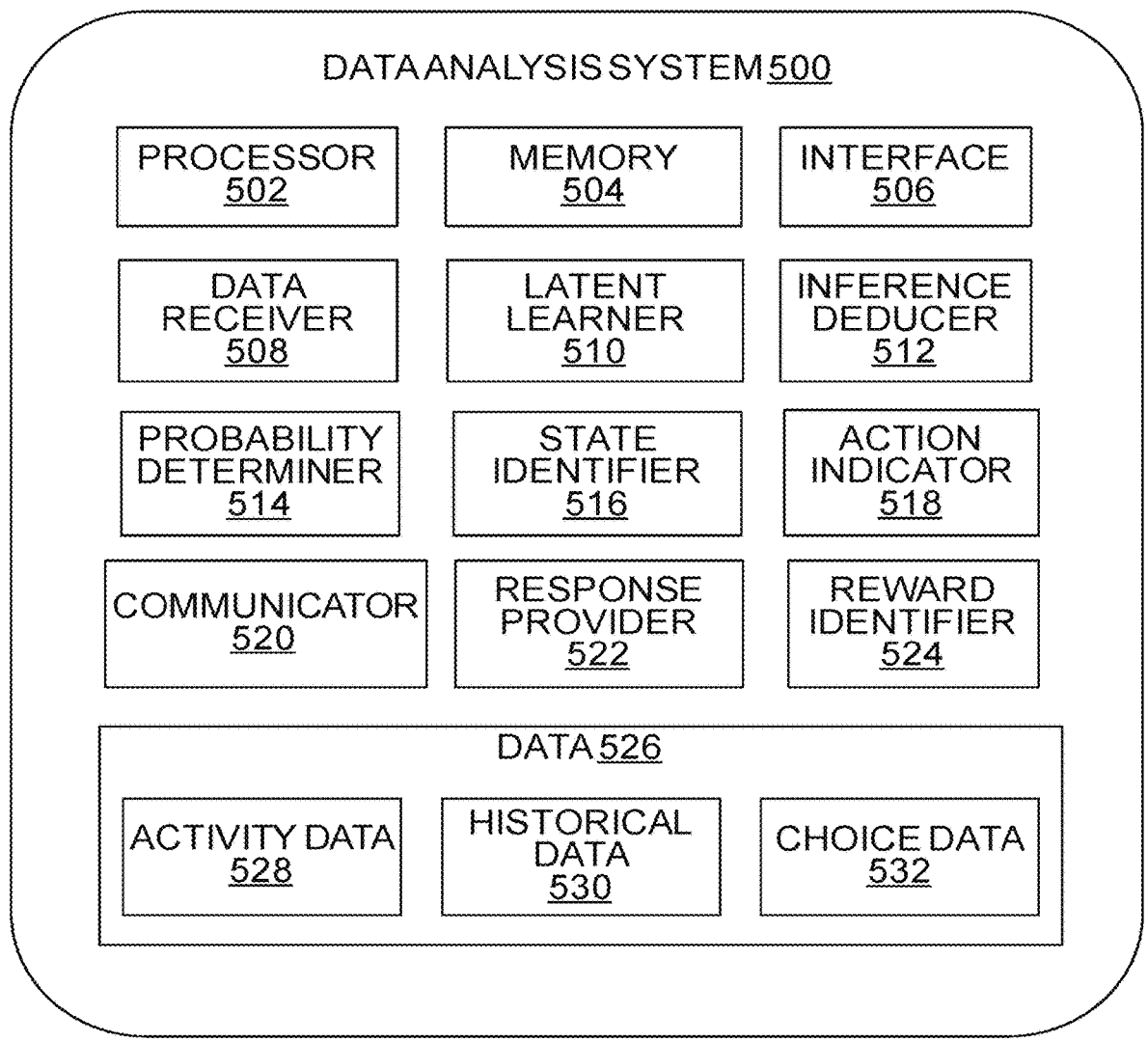
FIG. 5 illustrates a block diagram of the data analysis system, in accordance with an embodiment of the present subject matter.

FIG. 5 illustrates a block diagram of a data analysis system 500, in accordance with an embodiment of the present subject matter. The data analysis system 500 may also include hardware, input/output devices, storage and processors with applications to perform various functions. In an example, the smart card and the data analysis system 500 may administer machine readable instructions stored on a computer readable medium and are executable by a processor or other processing circuitry to perform various functions.

The data analysis system 500 includes a processor 502 such as a central processing unit or graphics processing unit or ASIC or other type of processing circuit and a memory 504. The memory 504 stores databases or other data structures for a database, such as the data source 110 as shown in FIG. 1. The data analysis system 500 may further include an interface 506 that may include a variety of software and hardware interfaces. The interface 506 may enable the data analysis system 500 to communicate with other devices, such as a smart card, an access device, and external data repositories, such as the data source 110, in the network environment 100. The interface 506 may include a network interface, such as a Local Area Network (LAN), a wireless 802.11×LAN, a 3G/4G/5G/XG mobile WAN or a WiMax WAN or a LIE WAN.

The data analysis system 500 may include additional components not shown and some of the components described may be removed and/or modified. For example, the data analysis system 500 may represent a server that runs the data analysis system 500 or the data analysis system 500 may include one of multiple distributed servers that performs various functions in a distributed computing environment.

The data analysis system 500 may include an operating system, executed as software to communicate between hardware and software; an application as one or more software to perform various functions; a log data that stores and processes access to the data analysis system 500. Each of these components may be operatively coupled to a data integration bus and a scheduler (not illustrated) to pull and push information as and when required.

Further, the data analysis system 500 may include a computer-readable medium that may be any suitable medium, which stores machine readable instructions to be executed by processor(s) 502. For example, a computer readable medium may be non-transitory and/or non-volatile, such as a magnetic disk or volatile media such as RAM, or pinned memory. The instructions stored on the computer readable medium may include machine readable instructions executed by the processor(s) 502 to perform various methods and functions. The computer readable medium may include solid state memory for storing machine readable instructions and/or for storing data temporarily, which may include information from the data repository, for performing project performance analysis.

Further, the computer readable medium may store an operating system, such as MAC OS, MS WINDOWS, SOLARIS, UNIX, or LINUX, and one or more applications, which include a software application providing the data analysis system 500. The operating system may be multi-user, multiprocessing, multitasking, multithreading, real-time and the like.

The data analysis system 500 includes a data receiver 508 to receive data pertaining to a current activity and a target activity of the individual. In an example, the data is received from at least one of the smart card 102 and the external data source 112. The data receiver 508 also determines an activity of individuals from the data received. For example, the data receiver 508 may determine the activity of the individual (which may be activities at locations of the access device) when connected to the access device 104-1 or 104-2 that may use the location technology, such as Geographic Information System (GIS), Global Positioning System ("GPS") technologies to perform the activity at the geographic location of the access devices 104-1 and 104-2 according to GPS coordinates.

Other suitable technologies may be used, including using principles of trilateration to evaluate radio frequency signals received by the access devices 104-1 and 104-2 (e.g., RF signals in a wireless phone network) and to determine activities and estimate the geographic location of the access devices 104-1 and 104-2. The activities and geographic location data from the smart card 102 and the access devices 104-1 and 104-2 are sent to the data analysis system 500 and stored in the data source 110.

The data receiver 508 may determine the activity and change in activity at a geographic location of individuals from the received data. Further, the data receiver 508 may provide data pertaining to activities, including content that has been created by or received from a smart card 102. For example, the data receiver 508 may receive content from the smart card 102 using the access devices 104-1 and 104-2, such as enabled individual activity (e.g., "car for commute") and organize the content for storage in the data source 110. The data receiver 508 may provide one of more functions including, but not limited to, annotating, processing, editing, rating, labeling, activating, commenting, blocking, reporting, and categorizing content. The data receiver 508 may also determine a current choice, a target choice and choice updates of an activity in real-time for the individual, and communicate a forecast of choice updates of an activity for the individual in real-time and notify individuals of their choices and updates via the access device 104-1 or 104-2.

In an implementation, the data receiver 508 also provides location-specific activity content, which may include initiating the smart card 102 to access and provide information representative of the content and associated data (e.g., activity data and/or other tagged data) to the data analysis system 500. The provided data may include the activity content, the associated geographic location data, and any other data used for prediction, prescription and optimization of a choice of unaided cue-set for the individual which, in turn, may be provided to the data analysis system 500. A "cue-set" can be understood to refer to a set of cues or triggers to provide certain choices, make certain decisions, or execute certain transactions. The data receiver 508 may prompt the individual for approval or confirmation before data is provided to the data analysis system 500 or the access device 104-1 or 104-2 and may automatically provide the data to the data analysis system 500 once activity content, location data, transactional data and other data and association thereof are established with the content.

The data receiver 508 may also be configured to store content received from the smart card 102 and the access device 104-1 or 104-2 (i.e., published content), and selectively distribute to the data analysis system 500 based on their activity and geographic locations. For example, when the individual uses the smart card 102 on the access device 104-1 or 104-2 at a geographic location associated with particular content, i.e., a predefined geographic proximity of an activity, the data analysis system 500 may make the content accessible to the individual within the predefined geographic proximity between the origin and target locations and within specified locations between the origin and target locations. The data analysis system 500 may send a notification that the content is accessible to the smart card 102 and the access device 104-1 or 104-2 within the predefined geographic proximity, and the individual may utilize the access device 104-1 or 104-2 to request and receive the content from the data analysis system 500.

The data receiver 508 may also store content received from the external systems such as the external data source 112 (e.g., protected content), and selectively distribute the content to the data analysis system 500 based on their activity and geographic locations. For example, when the individual uses the smart card 102 on the access device 104-1 or 104-2, at a geographic location associated with particular content, the data analysis system 500 may make the content from the external data source 112 accessible to the individual within the predefined geographic proximity between the origin and target locations and within specified locations between the origin and target locations. The data analysis system 500 may send a notification that the external data source 112 content is accessible to the smart card 102 and the access device 104-1 or 104-2 within the predefined geographic proximity, and the individual may utilize the access device 104-1 or 104-2 to request and receive the external data source 112 content from the data analysis system 500.

In this or similar manners, individuals using the smart card 102 on an access device 104-1 or 104-2 may create and receive activity content based on current activity at a geographic location, target geographic location and/or an active state (e.g., "static" and "dynamic"). The active state may include the individual's stationary state or dynamic state updates from a current activity content location to the target activity content location. The activity content may be associated with content associated with origin location, content associated with dynamic activity, content associated with the target location and content from the external data source 112 of the individual. Activity content may be based on forecasts, forecast updates, prescribe and prescribe updates which may be provided in real-time of current and future activities and dynamic activity. Activity content may be communicated for current communications and communication-threads in activity in real-time. Activity content may be distributed via multicast or unicast techniques. The availability of activity content may be selectively notified to the smart card 102 and the access devices 104-1 and 104-2 based on the geographic locations verified with the individual's identity. Accordingly, the individual may be able to use smart card 102 to share content with another individual using another smart card 102 in connection with a geographic location.

The data receiver 508 may provide the individual associated with activity content and/or geographic locations with one or more tools for annotating the content and/or communicating with one another. For example, the individual who has been authenticated to protected content and/or publish content may annotate the content such as by editing the content, rating the content, or publishing a comment about the content to the data analysis system 500. The individual who published the content may access the annotation and respond to the individual who provided the annotation. Such communications between the individual may be processed as a communication-thread to which the individual involved may be granted access. Annotations may be updated and distributed in real-time. Examples of annotations may be service updates, such as change in product specification, accident information, etc.

The data analysis system 500 may support a wide variety of applications and use. In one example, the individual may utilize a smart card 102 on the access device (e.g., a mobile phone) 110 to record investment trading at a trading exchange. The smart card 102 may be configured to detect an access device for the activity content at a geographic location where the content may be created, arranged with the geographic location, and presented the content with location, and may be according to the choice of unaided cue-set, to the smart card 102 (also "activity content"). When another individual with another smart card 102 on another access device 104-1 or 104-2 to record trading goods within a predefined geographic proximity of trading exchange associated with the published content, the data analysis system 500 may send a notification of the accessible content to the smart card 102 and the access device 104-1 or 104-2 and the individual may utilize the smart card 102 and the access device 104-1 or 104-2 to download and view the content.

The content in connection to the activity, for example trading goods may be established between two or more individuals and the two individuals may smart card 102 to annotate the content and/or create a communication thread between each other. For example, one individual may sell goods and input a comment, e.g., "100 bags of ABC", to data analysis system 500. Other individuals in the trading exchange may use the smart card 102 and the access device 104-1 or 104-2 to gain access the published content associated with the geographic location, e.g., the trading exchange and content threads.

In another example, during a car service, an individual may post activity content to the data analysis system 500 and subsequently use the published activity content as the service. For instance, the individual may access and group published content based on different geographic service location associated with the activity content and/or a period of time corresponding with the car service. The published activity content may be presented as a virtual service queue or service-priority. The individual, in another instance, may travel to a particular geographic service location to gain access to published activity content associated with the geographic service location. The individual may be able to utilize the published activity content to plan and/or improve the individual's activities at the geographic location. The published activity content, for example, may include suggestions as to recommended places to eat, places to stay or people to visit, etc. Such publishing may be provided by other users on the same or similar activity and may be based on their experiences.

In yet another example, an activity content may be used to distribute local information. An organization, for instance, may use external data source 112 to provide an activity content on the activity for activation purposes, including information about product specifications, product tests, usage patterns and conditions, availability, risk exposures, reliability, etc. A service event venue, in another instance, may post content including service highlights, schedules, maps, and product and parts information. A product company, in another instance, may post product specification information, vendors, tests and review information. The individual may use the smart card 102 on the access device 104-1 or 104-2 who gain access to the published information may annotate and/or respond to the information as described above. For example, the individual viewing published content descriptive of product information may notify the service organization that published the content about current product conditions (e.g., product damaged or activation restricted).

The data analysis system 500 may include a probability determiner 510 to formulate and make predictions. The predictions may include determining the current and next activity of the individual. For example, the data analysis system 500 may determine that the current activity and the current location of the individual based on the smart card 102, the access device 104-1 or 104-2, data from the external data source 112 and other data received from the data sources. The probability determiner 510 may use historical data for the individual to predict the individual's current activity as well as immediate future activity. Further, the probability determiner 510 may make additional predictions about the individual's future activity, for example, the individual is in the workplace and the individual has a set of choices for buying goods at a future price.

In an implementation, the probability determiner 510 may include various forecasting and maximum likelihood estimation methods for making the predictions. The probability determiner 510 may use various combinatorial and stochastic methods including, but not limited to, Markov functions, Bayesian Network ("BN") expectation maximization ("EM"), Econometric Forecast Model ("EFM"), parametric and non-parametric ("PNP"), partial differential equations ("PDE"), Bayesian belief network (BBN), quantum statistical mechanics (QSM), evolutionary quantum game ("EQG") and statistical physics ("STP") methods such as Mean-field, Ising spin-glass, replica theory, saddle point, entropy, ensemble, micro-cellular automata and drift diffusion to predict current activity or target activity or other predictions for a plurality of choices for the activity for the individual. Examples of different functions and technologies for the probability determiner 510 are described below.

The probability determiner 510 may use a function or logic for prediction based on current activity content (e.g., product data) and/or historical data, various forecasting methods and minimization of error methods such as stochastic optimization, combinatorial optimization, integer programming, dynamic programming, simultaneous perturbation stochastic approximation, stochastic gradient decent, quasi-Newton etc. to optimize the data receiver 508 for the current activity or the target activity or other predictions for the plurality of choices for the individual and the group, where individual is a member.

In an implementation, the data analysis system 500 may include a latent learner 512 to arrange data in a multi-dimensional structure based on a target activity defined by an individual. As mentioned above, the data pertains to one of a current activity and a target activity of the individual. The latent learner 512 arranges, formulates and analyzes latent causal variables including attributes, features, traits, preferences, behaviors and other cognitive information for the individual and importance thereof to confirm and order signal content of current activity, target activity and other information of the individual and aggregate the same for the group.

For example, the probability determiner 510 may determine a probability of the individual for service engine replacement. The latent learner 512 may get the probabilities and may initiate self-organized cognitive algebraic neural network structure ("SCANN"), a multi-layered multi-dimensional structure, to access and arrange information to confirm, detect anomalies and rank order signal content of the current activity, for the plurality of choices (e.g., product engine condition for service) to the smart card 102 and the access device 104-1 or 104-2 for the individual asking if the engine to replace now or later. If the individual confirms and that corroborates with the previous actions then the data analysis system 500 learns to reinforce decisions or declare anomalies. The latent learner 512 may autonomously formulate latent causal variables including attributes, features, traits, preferences, behaviors and other cognitive information, apply previous as well as new learning to confirm, rank order thereof on the data receiver 508 of the current activity or the target activity or other transactional data for the plurality of choices of the individual and the group, where the individual is a member, and send the plurality of choices to the access device 104-1 or 104-2.

In an implementation, the data analysis system 500 may include a communicator 514 to establish connection between the data analysis system 500 and the smart card 102 as a peer-to-peer network. The communicator 514 also establishes a communication thread between at least two individuals having smart cards. The communicator 520 may transmit and receive communications over the network, including sending and receiving transactional data, representative of activity content and associated data (e.g., location data) from and providing a plurality of choices to the smart card 102 and the access devices 104-1 and 104-2 by way of the network. The communicator 514 may include and/or support any suitable communication platforms and technology for communicating with and transporting content and associated data to and from the smart card 102 and the access devices 104-1 and 104-2 over a network in unicast and multi-cast formation.

The communicator 514 may be configured to support a variety of communication platforms, protocols, security and formats such that the data analysis system 500 may receive content from and distribute content to a variety of platforms (e.g., a mobile telephone service platform, a web-based platform, a subscriber television platform, internet of things platform, etc.) and using a variety of communications technologies in unicast and multi-cast formation.

Further, the data analysis system 500 may include an inference deducer 516 that may formulate, analyze and deduce the data received from the data receiver 508 with latent causal variables including attributes, features, traits, preferences, behaviors and other cognitive information for the individual and importance thereof to determine a state, an action, expected response, or reward for a plurality of choices for the individual and for the group or network where individual is a member. For example, the probability determiner 510 may determine a probability of the individual for buying a product at certain future price points. The inference deducer 516 may get probabilities and may initiate a learning method, such as proactive-retroactive learning to predict and prescribe product's latent causal variables that may influence its price including attributes, features, traits, preferences, behaviors and other cognitive information for the individual and importance thereof and deduce cognitive state (e.g., preferred value-for-money utility of the product), action (e.g., order 100 units of the product at the future price), expected response (e.g., the seller likely to accept the price point) and reward (e.g., the buyer save $3000 over time) of the individual for the product and activity for the plurality of choices of the individual and the group or network where individual is the member.

In an implementation, the inference deducer 516 may autonomously formulate statistical and machine learning methods including but not limited to trade-off Analyses ("TA"), usage attitude ("UA") evolutionary algorithm ("EA"), support vector machines ("SVM"), bagged decision forest ("BDF"), deep belief network ("DBN") Hidden Markov Model ("HIVIM") evolutionary quantum game ("EQG"), quantum statistical mechanics ("QSM") and Econometric, Psychometric, and Ethographic ("EPE"), quantum decision technique ("QDT"), Monte Carlo tree search methods and any combinations thereof for prediction and prescription; analyze dynamic active state rules and historical rules for (im)perfect and (in)complete information condition, and anomalies thereof, related to an activity. The inference deducer 516 may deduce optimal control policies of the current activity and the target activity of the individual, and anomalies thereof, for the plurality of choices in an unaided manner to aid a dynamic optimal response as a feedback-loop for each individual modeled as a quantum candidate and may use shearing methods or other techniques as structure-preserve mapping, morphism, disjoint union, combined with stochastic and optimal control methods to aggregate for the group or network. Further, the inference deducer 516 may transmit the plurality of choices to the communicator 514 to present and/or display of the plurality of choices for the individual on the smart card 102.

In another implementation, the data analysis system 500 may also include a state identifier 518, which determines the experiences of the individual performing an activity that is identified by the data analysis system 500. The state identifier 518 may use data from data receiver 508 along with predictions and prescriptions information generated by the probabilities determiner 510, the latent learner 512, and inference deducer 516 and may send and receive information to the smart card 102 and the access device 104-1 or 104-2 to determine the state—physical, biological, financial, cognitive, behavioral, emotional, etc., on the data receiver 508 (e.g., the individual is undecided; product is operating at 10%; etc.).

In an example, the data analysis system 500 determines the service engine had sufficient capacity to load all commuters and the vehicle may reach on time. The state identifier 518 may provide information, using the plurality of choices in the smart card, to service engineer to replace alternator that may impact various parts of the vehicle. The observed information received from the smart card 102 and the access devices 104-1 and 104-2 are stored in active workspace ("active workspace") of the communicator 514, until the state changes, at which time the state information are stored as historical data.

The data analysis system 500 may also include an action indicator 520, which determines an action or a series of actions of the individual performing an activity that is identified by the data analysis system 500. The action indicator 518 may use data from the data receiver 508 and state identifier 518 along with along with predictions and prescriptions information generated by probability determiner 510, latent learner 512, and the inference deducer 516 and may send and receive information to and from the smart card 102 and the access device 104-1 or 104-2 to determine an action or a series of actions (e.g., order 100 units of prescribed medicine).

For example, the data analysis system 500 determines whether the patient had certain dosage of a medicine regime and that the individual, the doctor, may perform an action or a series of actions, (e.g., find the test result of previous drug effectiveness) before prescribing the next medical course that may start on time. The action indicator 520 may provide information, to the doctor to check drug effectiveness or test results that may impact selecting the next activity. The observed information received from the smart card 102 and the access devices 104-1 and 104-2 are stored in active workspace of the communicator 514, until the state changes, at which time the state information are stored as historical data.

The data analysis system 500 may also include a response provider 522, which determines an expected response or a series of expected responses of the individual performing an activity that is identified by the data analysis system 500. The response provider 522 may use data from the data receiver 508, state identifier 518 and action indicator 520 along with predictions and prescriptions information generated by probability determiner 510, latent learner 512, and inference deducer 516 and may send and receive information to the smart card 102 and the access device 104-1 or 104-2 to determine an expected response or a series of expected responses (e.g., the trader likely to 'reject' the buyer offer).

For example, the data analysis system 500 determines that a buyer offered to buy certain unit of a commodity and that the individual, the trader, may perform an expected response or a series of responses (e.g., the buyer's quantity is below threshold) before prescribing the next order actions that may start on time. The responses provider 522 may provide information, to the trader to check price-quantity value that may impact selecting the next activity. The observed information received from the smart card 102 and the access devices 104-1 and 104-2 are stored in active workspace of the communicator 514, until the state changes, at which time the state information are stored as historical data.

The data analysis system 500 may also include a rewards identifier 524, which determines a reward or a series of rewards of the individual performing an activity that is identified by the data analysis system 500. The rewards identifier 524 may use data from the data receiver 508, the state identifier 518, the action indicator 520 and the response provider 522 along with predictions and prescriptions information generated by the probability determiner 510, the latent learner 512, and the inference deducer 516. The rewards identifier 524 may send and receive information to the smart card 102 and the access device 104-1 or 104-2 to determine a reward or a series of rewards (e.g., "pay-off $3000, savings 10%, risk neutral").

For example, the data analysis system 500 determines a quality test in a manufacturing plant may delay the product launch and that the individual, the manager, may perform an expected value-benefit (e.g., replace vendor part likely increase in profit by 30%) before prescribing the next order actions that may start on time. The rewards identifier 108 may provide information, using unaided cue-set in cue card, to the plant manager to change the manufacturing line that may impact selecting the next activity. The observed information received from the smart card 102 and the access devices 104-1 and 104-2 are stored in the active workspace of the communicator 514, until the state changes, at which time the state information are stored as historical data.

Figure 6:
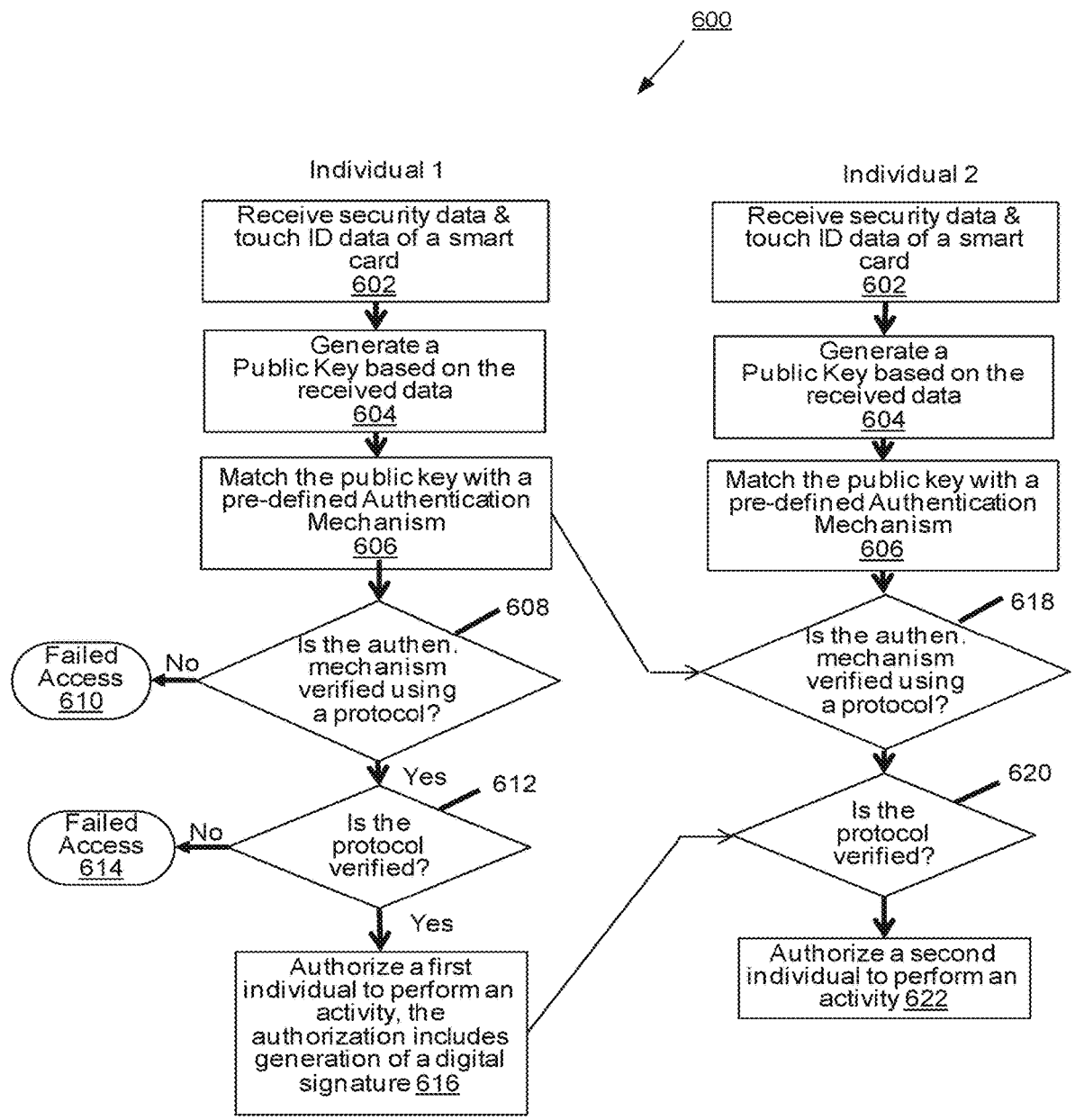
FIG. 6 illustrates a flowchart depicting a method of connecting one smart card with another smart card, in accordance with an embodiment of the present subject matter.

FIG. 6 illustrates a flowchart depicting a method 600 of connecting one smart card with another smart card, in accordance with an embodiment of the present subject matter. The method 600 may be executed by the data analysis system 500 for the smart card 102 to connect with another smart card and/or the access device 104-1 or 104-2 and/or the data analysis system 500, and/or external data sources 112 and, thus, form a peer-to-peer network.

At block 602, the method 600 includes receiving a security data and touch ID data pertaining to the smart card 102. At block 604, the method 600 includes generating a public key based on the received data. At block 606, the public key is matched with a pre-defined authentication mechanism. Examples of the authentication mechanism may include, but are not limited to, private key, QR code, public-private key combination, etc. of the application in the access device 104-1 or 104-2.

At block 608, it is determined whether the authentication mechanism is verified using a group or sub-group protocol. Examples of the protocol includes, but is not limited to, TCP/IP, UDP, SMTP, FTP, DHCP, HTTP, encryption protocol, cryptographic protocol, proprietary protocol, etc. or any combination thereof. If the protocol is not verified, the method 600 moves to block 610 where the access is denied. If the protocol is verified, the method 600 moves to block 612. At block 612, the method 600 includes determining whether or not the protocol is verified. If no, the method 600 ends at block 614. If yes, the method 600 moves to block 616. At block 616, the individual is authorized using one or more algebraic structure of elliptic curve digital signature algorithm for identity verification for an activity to perform for the individual.

In an implementation, since each activity input may have a cryptographic digital signature that unlocks the application from the prior transaction, at block 612, two-party activity input is verified. Only the person possessing the appropriate private key is able to create a satisfactory signature is verified at block 620, for each output determines authorization of the other party. This in effect ensures that activity to perform at block 622, may only be initiated and performed by the individuals with cue card 108, so and so forth for one or more individuals. This also ensures anonymous data is de-anonymized using methods including but not limited to statistical disclosure control, microdata, etc., or any combination thereof and cross-referenced with other sources of data to re-identify the anonymous data source. For example, a buyer having a smart card may connect with a seller also having a smart card, to negotiate a future price of a product for trade in retail or an exchange.

Figure 7:
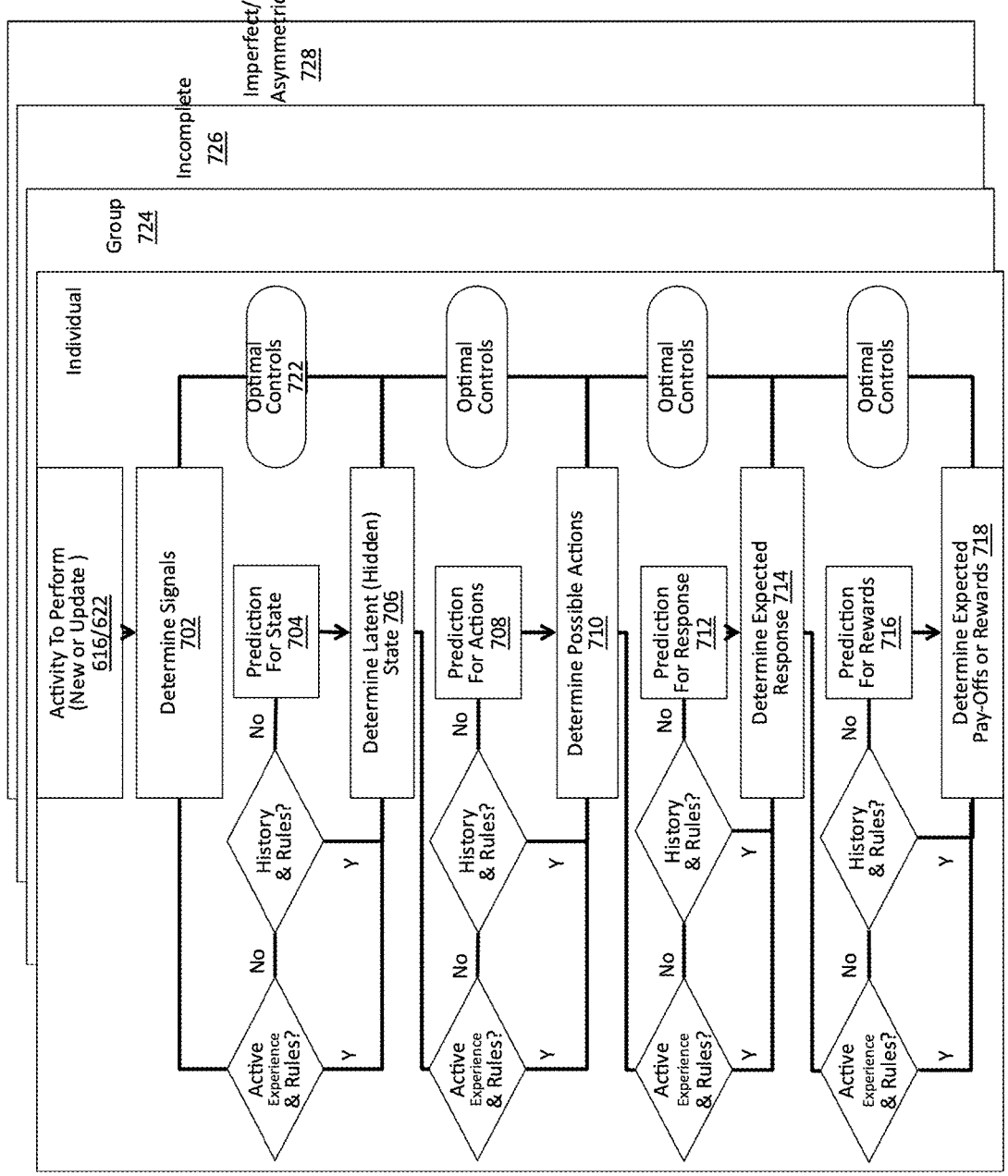
FIG. 7 illustrates a dynamic proactive-retroactive learning method implemented by the data analysis system, in accordance with an embodiment of the present subject matter.

FIG. 7 illustrates a dynamic proactive-retroactive learning method 700 (hereinafter referred to as method 700) implemented by the data analysis system 500, in accordance with an embodiment of the present subject matter. The method 700 predicts and prescribes an action in response to an activity of an individual. The method 700 may be used for a computer-readable machine autonomously learning that is performed by the data analysis system 100 that is illustrated in FIG. 1.

At block 702, a signal data is determined based on a new transactional data, or an update to a previously stored transactional data or data received from the smart card 102 or the access device 104-1 or 104-2 of the current activity or the target activity of the individual. Other data that are neither new nor update nor deemed relevant to the activity may be determined as noise ("noise data") for the activity of the individual.

At block 704, the signal data is used to predict the current state, such as physical, biological, financial, cognitive, behavioral, emotional, etc. as state content as shown in block 706 for the state identifier 518. The signal data may be related to immediate relevance including dynamic active state and/or active workspace ("active experience") 708 and, therefore, apply a certain set of rules that are associated with dynamic, real-time, sequential monadic, imperfect or asymmetric information conditions and any combination thereof on multi-dimensions—functional, non-functional, non-discriminating and discriminating—attributes and features to predict and determine the state for the state identifier 518. The signal data may be related to historical relevance including data previously stored, previous time period, previous activity ("historical data") and, therefore, may apply a certain set of rules associated with static, linear, continuous, paired comparison, perfect and complete information conditions and any combination thereof on multi-dimensions—functional, non-functional, non-discriminating and discriminating—attributes and features to predict and determine state 706 for the state identifier 518. The signal data 702 may neither be active experience nor be historical data, and, therefore apply a certain set of rules associated with non-parametric, non-linear, age dependent and incomplete or partial-complete information conditions and any combination thereof on multi-dimensions—functional, non-functional, non-discriminating and discriminating—attributes and features may be applied to predict and determine state 706 for the state identifier 518. The prediction may include determining a probability associated with the individual's current activity. For example, the buyer's system analyzes data to predict that the state of the product in trade may change with new features, conditions and/or models and thereby the underlying latent variables in the marketplace to affect price that may likely decline.

At step 708, state data 706 is used to predict the individual's current action 710 for the action indicator 520. The state data 706 may include the activity content, signal data 702 and/or other measured metrics that may indicate the current activity of the individual. The state data 706 may apply the rules of active experience and historical or neither for prediction 712 and thereby prescribe and determine an action 710 for the action indicator 520. The prediction and prescription may include determining a probability associated with the individual's current activity. For example, the buyer's system analyzes data to predict that the state of the product in trade will change with new features, conditions or models and thereby the underlying latent variables of the marketplace to affect price that may likely decline, therefore determines action to defer/hedge now and buy later at future price.

At step 712, action data 710 is used to predict the individual's expected response 714 for the response provider 522. The action data 710 may include the activity content, signal data 702, state data 706 and/or other measured metrics that may indicate the current activity of the individual. The action data 710 may apply the rules of active experience or historical data or neither for prediction 708, and thereby prescribe and determine expected response 714 for the response provider 522. The prediction and prescription may include determining a probability associated with the individual's current activity. For example, the buyer's system predicts that the state of the product in trade will change with new features, conditions or models and thereby the underlying latent variables of the marketplace to affect price that may likely decline, therefore the expected response of the seller may also likely follow the action to defer/hedge now and buy later at future price.

At step 716, response data 714 is used to predict the individual's expected reward 718 for the reward identifier 524. The response data 714 may include the activity content, signal data 702, state data 706, action data 710, location data and/or other measured metrics that may indicate the current activity of the individual. The response data 714 may apply the rules of active experience or historical data or neither for prediction, and thereby prescribe and determine expected reward 718 for the reward identifier 524. The prediction and prescription may include determining a probability associated with the individual's current activity. For example, the buyer's system predicts that the state of the product in trade will change with new features, conditions or models and thereby the underlying latent variables of the marketplace that affect price that may likely decline. Therefore, the expected response of the seller may also likely follow the action to defer/hedge now and buy later at future price, thus create a $1000 savings for the buyer.

At step 722, the state data 706, action data 710, expected response data 714 and reward data 718 may apply previously stored or formulate a new optimal controls 722 to form policies for each step. The policies may be used as a future reference on the activity for the individual. These optimal controls 722 include, but are not limited to, prior probabilities, posterior probabilities, discrete time, continuous time, stochastic upper bound, stochastic lower bound, stochastic target upper bound, stochastic target lower bound, out of control conditions and immune response conditions so that an additional predictor is applied to estimate the choice of the unaided cue-set. For example, the action indicator 520 may apply MCMC or dynamic programming or another type of predictor on state data 706 and/or the signal data 702 to predict the current activity of the individual.

The state data 706 may include historical data for the individual, including previous information conditions—(im)perfect and/or (in)complete—of the individual, previous activities performed by the individual, etc. The action indicator 520 may perform one or more pattern recognition method on historical data and may use to set optimal policies to predict the choice of the cue set for an activity of the individual.

At step 724, the above learning method may determine state data 706, action data 710, expected response data 714, reward data 718 and optimal controls 722 thereof may be applied for the group or network where the individual is a member and determine the action of the nearest-neighbor and optimal controls thereof for the choice of the unaided cue-set for the individual.

At step 726, the above learning method may determine state data 706, action data 710, expected response data 714, reward data 718 and optimal controls 722. Thus, the method 700 may be applied for incomplete information condition of one or more individuals, as transactional group or network on the activity, where individual is a member. Further, the method 700 facilitates in determining the action of the interaction group and optimal controls thereof for the choice of the unaided cue-set for the individual.

At step 728, the above learning method may determine state data 706, action data 710, expected response data 714, reward data 718 and optimal controls 722. Thus, the method 700 may be applied for imperfect or asymmetric information condition of one or more individuals, as transactional group or network on the activity, where individual is a member. Further, the method 700 facilitates in determining the action of the interaction group and optimal controls thereof for the choice of the unaided cue-set for the individual.

Figure 8:
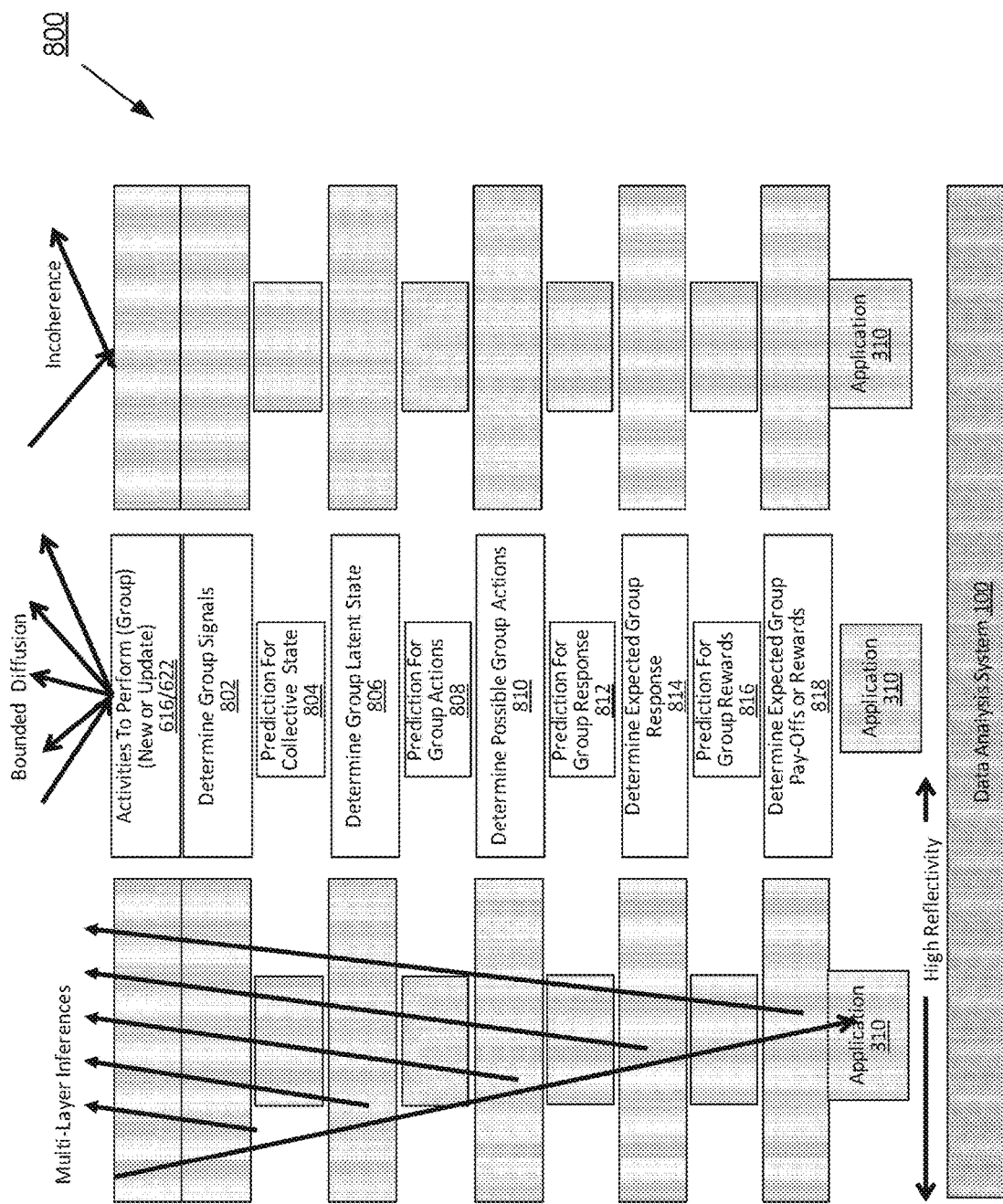
FIG. 8 illustrates a self-organized learning method, in accordance with an embodiment of the present subject matter.

FIG. 8 illustrates a self-organized learning method 800 (hereinafter referred to as method 800), in accordance with an embodiment of the present subject matter. The method 800 may be executed by the data analysis system 500 to segment a smart card for the peer-to-peer network based on bounded diffusion of collective individual information interactions. The method 800 may be trained for machine to learn that is performed by the data analysis system 500.

At block 802, group data is determined from grouping of individual transactional data for a group that includes the individual as a member. After a certain upper-bound number of groups, the data analysis system 500 may apply a diffusion-limited aggregation ("DLA")—a formation process whereby individuals in a group, as particles, and their signal data 802 may undergo a stochastic process due to Brownian motion for clustering together to different aggregates ("clusters") of such individuals. For example, the buyer-seller-trader network may segment into sub-segments of clusters based on predictive future use of a product, as one of the attributes that affect the price, after an upper bound, say one million, users of the system.

At block 804, the signal data is used to predict the group's current state data 806, as described above, and may apply DLA or other techniques such as sheafing, group theory, category theory, combinatorics, etc., which are collectively referred to as "grouping", depending on the geometry of the growth, for example, whether it be from a single point radially outward or from a plane or line, of clusters where the individual is a member, for the state identifier 518. For example, the buyer-seller-trader network for a sub-segment, say 'environment conscious' product, as one of the clusters that may continue to grow as more buyers and sellers continue to join the network.

At block 806, the learning method 800 may present data, for example, as stimulus, at some time t=0 and then present a response data at a variable time post stimulus on the group. The bounded diffusion in DLA, for example, may have one additional parameter, the position of the decision bound, say A. If at time t of the state data of the individual is x, the distribution of the state at a future time may be s>t, hence the term "forward" diffusion. The backward diffusion, on the other hand, may be useful when addressing the question when the individual at a future time has a particular behavior, the distribution at time is t<s. This may impose a terminal condition on the PDE, which is integrated backward in time, from s to t (hence the term "backward" is associated with this). Let g(x) be a bounded smooth (twice continuously differentiable having compact support) function, and let: u(t, x)=E$^{x,t}$(g(X(T))=E(g(X(T))|X(T)=x. with the "terminal" condition u(T, x)=g(x). In addition, if X(t) has a density p(t, x), then for a probability density function μ(.), the probability densities satisfy the $$\frac{\partial}{\partial_t} p(t, x) = (A^* p)(t, x)$$

where is the adjoint operator of A, defined as:

$$A^* v(t, y) = -\frac{\partial}{\partial_y}(b(y)v(t, y))\frac{1}{2}\frac{\partial^2}{\partial y^2}(\sigma^2(y)v(t, y).$$

This behavior may be described as fractal growth, that is observed frequently in plants (e.g., in ferns). The clusters may include formulating a group associated with the group's current activity as well as the nearest neighbor for the individual where individual is a member. For example, a trader's system, in a buyer-seller-trader network for a sub-segment of "environment conscious" as one of the clusters is bounded by one of the features or factors, say "environment friendly" product of offer period, to purchase a product may find higher price than the regular period.

At block 808, the state data 806 is used to predict the group's current action 810, as described above, and may apply DLA or other techniques, as described above at block 804, to formulate the clusters, where the individual is a member, for the action indicator 520. For example, the trader's system, in a buyer-seller-trader network for a sub-segment of "environment conscious" as one of the clusters, bounded by "environment friendly" as one of the features or factors, "environment friendly" product of offer period, discounts price to purchase a product for immediate benefit or pay higher market price later.

At block 810, the action data 802 is used to predict the group's expected response 814, as described above, and may apply DLA or other techniques, as described above to formulate clusters, where the individual is a member, for the response provider 522. For example, the trader's system in a buyer-seller-trader network for a sub-segment of "environment conscious" as one of the clusters, bounded by "environment friendly" as one of the features or factors, "environment friendly" product of offer period, accepts offer to purchase the product may find immediate acceptance value, or delay decision to pay higher market price later.

At block 816, the response data is used to predict the group's reward 818, as described above and may apply DLA or other techniques, as described above to formulate clusters, where the individual is a member, for the reward identifier 524. For example, the trader's system, in a buyer-seller-trader network for a sub-segment of "environment conscious" as one of the clusters, bounded by "environment friendly" as one of the features or factors, initiates settlement to purchase the product now with $1000 loss higher than the regular price of $700 later, however grows with increased number of buyers and sellers and thereby further expands the network.

Figure 9:
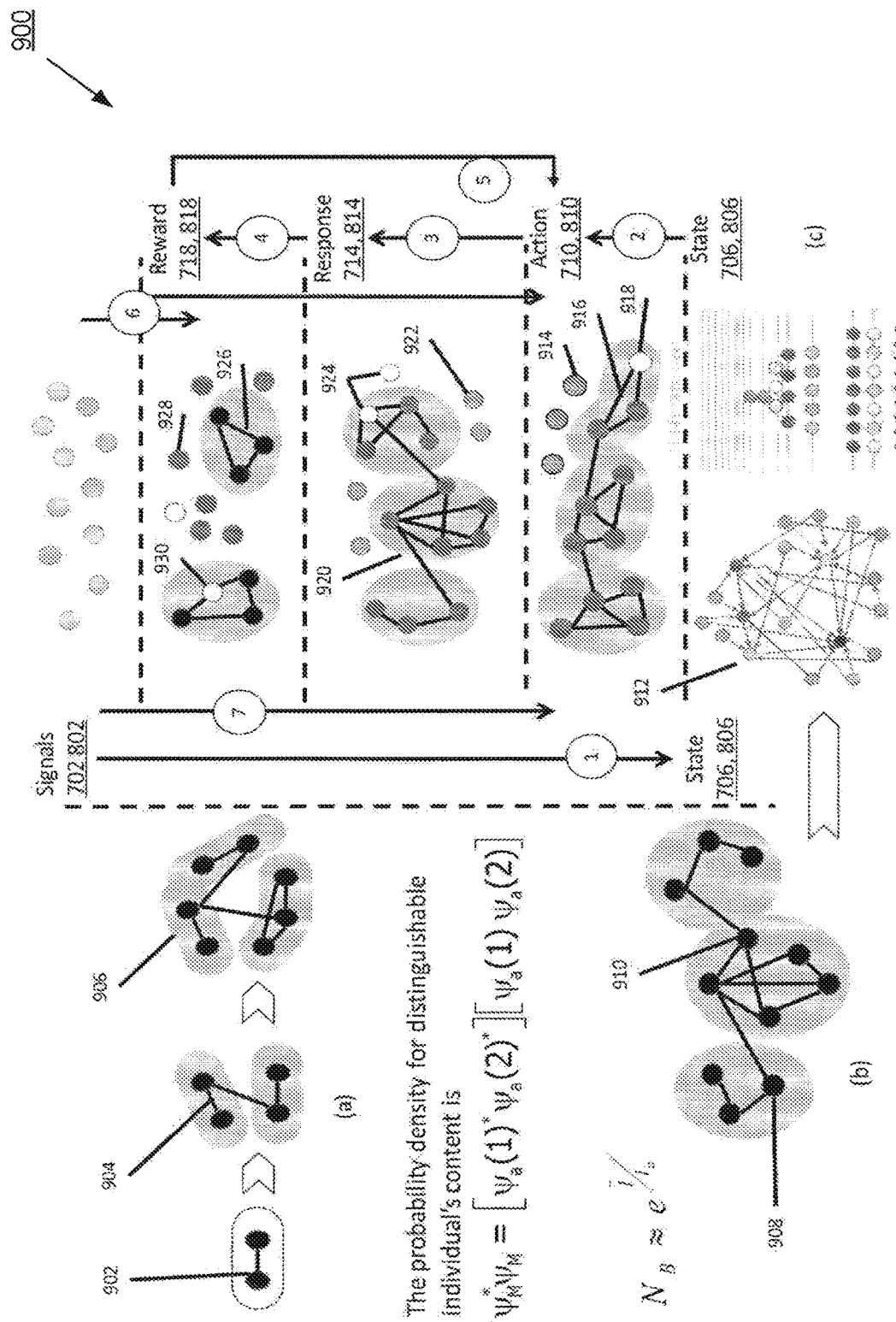
FIG. 9 illustrates a multi-layered multi-dimensional self-organized cognitive algebraic neural network ("SCANN") learning method, in accordance with an embodiment of the present subject matter.

FIG. 9 illustrates a multi-layered multi-dimensional self-organized cognitive algebraic neural network ("SCANN") learning method 900 (hereinafter referred to as method 900), in accordance with an embodiment of the present subject matter. The method 900 is employed for arranging information in determining undefined rules based on a cognitive structure for the individual. This may include choices in the plurality of choices determined and probability may include a maximum likelihood estimation of each choice for the cue card activity of the individual. In FIG. 9, 902 indicates, for example, that a set of data in activity may be determined for each individual (n). Further, 904 indicates more individuals are added to the activity content that form choices and different choice set attributes. The attributes may describe a factor that influences a choice. A choice set attribute may comprise one or more attributes, for example, of the product such as one or a combination of sensory attributes, (taste, looks, etc.), rational (price, ingredients, etc.) and psychological/emotional (feel good, lifestyle, etc.).

In an implementation, 906 indicates formation of a group with different clusters based on activity and/or factors for each choice set as a function of activity and interactions within a group, where the individual is a member. 908 indicates common contact individual and/or individual's activity content between individuals in a group. Further, 910 indicates a "hub" contact or "cross" features and attributes for individual and/or individual's activity content between individuals in a group, thus forms a graph structure of the network. For example, the buyer's system finds the product with a "premium" look and also "environment friendly" as hub or cross attributes in the purchase decision.

A network (or graph) is a pair (N, g), where g is a network on the set of nodes N. A relationship between two nodes i and j, represented by ij∈ g, is referred to as a link or edge. Thus, g will sometimes be an n×n adjacency matrix, with entry denoting whether i is linked to j and may also include the intensity of that relationship. A walk in a network (N, g) refers to a sequence of nodes, $i_1, i_2, i_3, \ldots i_{k-1}, i_k$ such that $i_k i_{k+1} \in$ g for each k from 1 to K−1. A path in a network (N, g) is a walk in (N, g), $i_1, i_2, i_3, \ldots i_{k-1}, i_k$ such that all the nodes are distinct. A cycle in a network (N, g) is a walk in (N, g) $i_1, i_2, i_3, \ldots i_{k-1}, i_k$ such that $i_1 = i_k$. The distance between two nodes in the same component of a network is the length of a shortest path (also known as a geodesic) between them. The neighbors of a node i in a network (N, g) are denoted by $N_i$ (g). The degree of a node i in a network (N, g) is the number of neighbors that i has in the network, so that $d_i(g) = |N_i(g)|$. Individual systems and their interactions with the network have two fundamental properties: the small world (get "satisfied" or "dissatisfied" from one or two network interactions) and the scale-free properties ("make it viral" in other network interactions). Many naturally occurring networks are small world, because one may reach a given node from another one, following the path with the smallest number of links between the nodes, in a very small number of steps. It is mathematically expressed by the slow (logarithmic) increase of the average diameter of the network, $\bar{l}$; with the total number of nodes N, $\bar{l} < \ln N$; where $\bar{l}$ is the shortest distance between two nodes and defines the distance metric in networks (Erdös and Renyi 1960) equivalently, obtains $N \approx e^{\bar{l}/l_o}$, where $l_o$ is a characteristic length. A second fundamental property in this networks arises with the discovery that the probability distribution of the number of links per node, P(k) (also known as the degree distribution), may be represented by a power-law ('scale-free') with a degree exponent y that is usually in the range 2<y<3 $P(k) \approx k^{-y}$. The Multilayered multi-dimensional network, as represented in this FIG. 10, for example, that explicitly incorporate multiple channels of connectivity and constitute the natural environment to describe systems interconnected through different categories of connections: each activity content module (signals, states, actions, responses and rewards) may be represented by a layer and the same node or entity may have different kinds of interactions (set of neighbors in each layer).

At 912, the latent learner 512 is abstracted from variables to render microstate probabilities of each (dis)satisfied individual attributes features and latent causal variables and other factors, accessible by mere combinatorial, (im)perfect and (in)complete information conditions much in the same way as graph probabilities, as formalized, are accessible in random graph. For example, the buyer's system finds the product with a choice may be whether to purchase a premium and environment friendly product or a low-capacity product, as latent variable that has causal affect on "premium" and "environment". Examples of the alternative variables may include product, brand or variant alternatives that are available in the choice set for the individual in a particular state to exercise preference. The latent learning 111 variables are shown as X and a choice for one over another is expressed as (1 . . . i) of X. The interaction variables may include bargaining variables, such as coupons, discounts, auction-bids, promotions that are available for individuals to exercise preference, or any variable involving an interaction of the individual for a good or service. The coefficient may be predetermined and represents a diminishing level of satisfaction, for example, over time. This also shows that, in cognitive decision, despite their non-equilibrium and irreversible nature, evolving network may be mapped into an equilibrium Bose-Einstein ("BE") condensation nodes corresponding to energy levels, and links representing individual's activity contents, as particles. This mapping predicts that the common epithets used to characterize competitive networks emerge naturally as thermodynamically and topologically distinct phases of the underlying evolving network. In particular, this may predict that such network may undergo BE condensation, in which a single node captures a macroscopic fraction of links. The existence of a state transition, phase to a BE condensate, the outcome distribution $g(\epsilon) = C\epsilon^\theta$ where θ is a free parameter and the energies are chosen from $\epsilon \in (0, \epsilon_{max})$ with normalization $$C = \theta + 1 \Big/ \left(\epsilon \frac{\theta + 1}{\max}\right).$$

For this class of distributions the cognitive state for a Bose condensation is:

$$\frac{\theta + 1}{(\beta \epsilon_{max})^{\theta+1}} \int_{\beta \epsilon_{min(t)}}^{\beta \epsilon_{max}} dx \frac{x^\theta}{e^{x-1}} < 1.$$

A particularly active strand of study in this direction is the study of individualized ensembles with fixed degree sequences, or degree distributions following, for instance, a power-law. This is, the probability that a randomly chosen node in the network has exactly l links, is proportional to $l^{-y}$ for some y∈ (2, ∞). For example, the buyer's system, in buyer-seller-trader network, may be in "search" or "pre-purchase" state of mind for the premium and environment friendly product with low-capacity, as a given set of latent variables of "hub/cross" features, attributes and variables.

At 914, indicates a individuals in N have action spaces $A_i$. Let $A = A_1, \ldots A_n$. In this, the action spaces are finite sets or subsets of a Hilbert space. Generally, decision making is not necessarily associated with a choice of just one action among several simple given actions, but it involves a choice between several complex actions. The elementary prospect $(e_n)$ is the conjunction of the chosen modes, one for each of the actions from the intended action. To each elementary prospect $e_n$, there corresponds the basic state $|e_n\rangle$, which is a complex function is $A^N \rightarrow C$, and its Hermitian conjugate $\langle e_n|$. The structure of a basic state is $\langle e_n| = \otimes_{i=1}^{N} |A_{iv_j}$. The mind space is the closed linear envelope M=Span $\{|e_n\rangle\} = \otimes_{i=1}^{N} M$. To each prospect TTj there corresponds a state $|\pi_j\rangle \in M$ that is a member of the mind space. $|\pi_j\rangle = \Sigma_n a_{jn}|e_n\rangle$. This may apply QDT as an intrinsically probabilistic procedure. The first step consists in evaluating, consciously and/or subconsciously, the probabilities of choosing different prospects from the point of view of their usefulness and/or appeal to the choosing agent. If the mapping from a state parameter w to the conditional probability density p(y|x, w) is one-to-one, then the model is called identifiable, i.e., if the product in service is in its lowest state then the likelihood of that product to fail is significantly high. If otherwise, then it is called non-identifiable. In other words, a model is identifiable if and only if its parameter is uniquely determined from its state and/or cognitive behavior. For example, the buyer's system may be in "search" state of mind for the premium and environment friendly product with low-capacity, as a given set of latent variables of "hub/cross" features, attributes and variables, searches for the product as likely "intended" action.

At 916, in non-identifiable cases actions may be dynamic and/or in active workspace as the action data of the individual "wait" for more signal data and/or transactional data to make connection for action or lack of confidence (best matching neighborhood action cells) on the existing signal data. For these actions a new set of information is required, as new cell, C, and a local counter variable $\tau_C$, therefore, basically constraining the number of input signals for which the action has best-matching unit. For example, the buyer's system may wait for additional feature information of the product, say "capacity" of the various products, to complete information in "search" state of mind for decision. At the same time, the seller's system is waiting for the buyer's system to request for "capacity" of the various products information for buyer's system decision.

Further, at 918, introduction of a new signal data, as a new cell, C, with a local counter variable $\tau_C$ and since the cells are slightly moving around, more recent signals may be weighted stronger than previous ones. An adaptation step, for example, may be formulated as: a) choose an input signal data according to the probability distribution P($\zeta$), b) locate the best matching unit $c=\varnothing_w(\zeta)$ c) increase matching for c and its direct topological neighbors $\Delta w_c = \varepsilon_b(\zeta - w_c)$, d) Increment the signal counter of c, as new signal data gets added, either via another activity e.g., a call from a friend, or autonomously as "how about . . . " $\Delta\tau_c=1$, e) decrease all signal counters by a fraction $\alpha$: $\Delta\tau_c=-\alpha\tau_C$ (not shown in the diagram) which is uniquely determines the change in action due to new signal data that influenced its state and/or cognitive behavior. The relative signal frequency of a cell C is: $h_c = \tau_c/\Sigma_{j \in A}\tau_j$. A high value of $h_c$, therefore, indicates a good position to insert a new latent variable, as cell, because the new latent variable, cell, is likely to reduce this high value of action to a certain degree. The insertion of new cells leads to a new Voronoi region, F, in the input space. At the same time the Voronoi regions of the topological neighbors of C are diminished. This change is reflected by an according redistribution of the counter variables $\tau_C$. A multi-dimensional optimizing factor determined using Monte Carlo Markov Chain, Hidden Markov Model (HMM), quasi-Newton or another technique to find the optimal weights at each activity content for the individual to reduce errors and/or determine maximum likelihood of an action for the activity of the individual. For example, the buyer's system may receive new feature information of the product from a trusted group or friend in buyer-seller-trader network, say "increased capacity" at "discounted" price, during "search" state of mind for decision. At the same time, the seller's system analyzes data for a "better prospect" likelihood of purchase for buyer's decision.

At 920, while settings with a fixed network interactions are widely applicable, there are also many conditions where the individual and/or the group that includes the individual, choose actions without fully knowing with whom they will interact and what would be their response. Instead of a fixed network, individuals are now unsure about the network that will be in place in the future, but have some idea of the number of interactions that they will have. To fix ideas, the individual and/or a group that includes individual as a member and their action data may choose to find expected response that is only useful in interactions with other individuals who has the same product as well, but without being sure of with whom one will interact in the future. In particular, the set of individuals N is fixed, but the network (N, g) is unknown when individuals choose their actions. A individual i knows his or her own degree $d_i$, when choosing an action, but does not yet know the realized network. Individuals choose actions in {0,1}, individual i has a cost of choosing action 1, denoted $c_i$. Individual i's payoff from action 1 when i has $d_i$, neighbors and expects them each independently to choose 1 with a probability x is: $v(d_i, x)-c_i$ and so action 1 is a expected response for individual i if and only if $c_i \leq v(d_i, x)$. The payoff to the individual from taking action 1 compared to action 0 depends on the number of neighbors who choose action 1, so that sign $(u_i(1, a_{N_i(g)}) - u_i(0, a_{N_i(g)}))=\text{sign}(\Sigma_{j \in Ni(g)}a_j - \Sigma_{j \in Ni(g)}1-a_j)$ more than one half of i's neighbors choose action 1, for example, then it is best for individual i to choose 1, and if fewer than one half of i's neighbors choose action 1 then it is best for individual i to choose action 0. There may be multiple equilibria in this situation. For example, the buyer's system may take action to "evaluate" the product before final purchase. At the same time, the seller system determines "confidence" of purchase for buyer's system decision At 922, in non-identifiable cases of expected response may be dynamic and/or in active workspace, as the expected response data of the individual "wait" for more signal data or action data to make connection for expected response or lack of confidence (best matching neighborhood action cells) on the existing signal data. For example, the aggregate trades of agents in a stock market produce the data characterizing this market that is then available to all and mediates the indirect interactions between them. Learning these data gives information to each of the traders. The prospect probability may be defined as: $p(\pi_j, \tau) = \text{Tr}_{AB}\hat{\rho}_{AB}(\tau)\hat{P}(\pi_j)$. The interaction of the decision maker with the group may ensure that the individual keeps distinct identity and personality while, at the same time, possibly changing state of mind. In other words, the surrounding group does influence the individual's state, but does so in a way that does not suppress the person making own decisions. This corresponds to the behavior of a subsystem that is part of a larger system that changes the subsystem properties, while the subsystem is not destroyed and retains its typical features. For example, the buyer's system at the time of "evaluation" of the product may wait for additional feature information, say "warranty period", to complete "evaluation" of the product. The seller's system provides such information to increase "confidence" of purchase for buyer's system decision.

At 924, introduction of a new signal data, or action data as a new cell, C, with a local counter variable $\tau_C$ and since the cells are slightly moving around, more recent signals may be weighted stronger than previous ones. An adaptation step may be formulated as stated earlier in 918. Here the changes of the signal and action counters as redistribution of the counter variables may be seen as ascribing to the new cell. This new cell is connected to the existing expected response cells in such a way that may again provide a structure consisting only of k-dimensional simplices:

$$\Delta \tau_C = \frac{|F_C^{New} - F_C^{Old}|}{|F_C^{Old}|}$$

a new Voronoi region exists now. As much input signals and/or actions as it would have received if it had existed since the beginning of the process. In the same way the reduction of the counter variables of its neighbors may be motivated by making more information available to all. In such network interactions the possible outcomes of the D and C to two basis vectors |D⟩ and |C⟩ in the space of a two-state condition, e.g., either coffee (A) or juice (B), the state of the situation may be described by a vector in the product space which could be spanned by the basis |CC⟩, |CD⟩, |DC⟩, and |DD⟩, where the first and second entries refer to A's and B's states, respectively. This may denote the responses initial state by $|\psi_0\rangle = \hat{J}|CC\rangle$, where $\hat{J}$ is a unitary operator which may be known to both individuals. For fair response, $\hat{J}$ must be symmetric with respect to the interchange of the two individuals. The strategies are executed on the distributed pair of state situations in the state $|\psi\rangle$. Strategic moves of two individuals, for example, A and B are associated with unitary operators $\hat{U}_A$ and $\hat{U}_B$, respectively, which are chosen from a strategic space S. The independence of the individuals dictates that $\hat{U}_A$ and $\hat{U}_B$ operate exclusively on the states in A's and B's possession, respectively. The strategic space S may therefore be identified with some subset of the group of unitary 2×2 matrices. Having executed their moves, which leaves the situation in a state $(\hat{U}_A \otimes \hat{U}_B)\hat{J}|CC\rangle$, A and B forward their states for the final measurement which determines their payoff. The only strategic notion of a payoff may be the expected payoff. A's expected payoff may be given by $\$_A$ r$P_{CC}$+p$P_{DD}$+r$P_{DC}$+ s$P_{CD}$ where $P_{\sigma\sigma'} = |\langle \sigma\sigma'|\psi_f\rangle|$ is the joint probability that the channels σ and σ'. A's expected payoff $\$_A$ not only depends on her choice of strategy $\hat{U}_A$, but also on B's choice $\hat{U}_B$. For example, the buyer's system may receive new feature information of the product, from a trusted group or friend in buyer-seller-trader network, say "additional price" for warranty, during "evaluation" for decision. At the same time, the seller's system may determine information of the product to offer "adjusted price" to increase "confidence" of purchase for buyer's system decision.

At 926, Individual i's reward or payoff function may be denoted $u_i$. 20 A×G(N)→ℝ. A given individual's payoff depends on the group where the individual is a member or other individuals' behaviors, but only on those to whom the individual is (directly) linked in the network. In fact, without loss of generality the network may be taken to indicate the payoff interactions in the group. More formally, individual's payoff may depend on $a_i$ and $\{a_j\}_{j \in N_{i(g)}}$ so that for any i, $a_i$, g: $u_i(a_i a_{-i}, g) = u_i(a_i, á_{-i}, g)$ whenever $a_j = áj$ for all $j \in N_i(g)$. Unless otherwise indicated the equilibrium, may be a pure strategy Nash equilibrium: a profile of actions $a \in A = A_1 \times \ldots A_n$, such that $u_i(a_i, a_{-i}, g) \geq u_i(á_i, a_{-i}, g)$ for all $á_i \in A_i$.

In the case with large fluctuations in input of expected response with large-scale networks, however, the weights increase without limits due to the diffusion effect if weight constraints are absent. Nevertheless, the choice probability of a network with diverging weights asymptotically approaches matching behavior. A weight-normalization constraint may be imposed for the diffusion effect to become more evident than in cases without normalization. For example, the buyer's system may determine the reward of the product, say "20% premium", for decision. At the same time, the seller's system may determine to be "undecided" likelihood for buyer's system decision.

At 928, however, in non-identifiable cases of reward may be in dynamic and/or active workspace, as the reward data of the individual "waits" for more signal data or action data or expected response data to make connection for reward or lack of confidence (best matching neighborhood action cells) on the existing signal data. The information may be received through direct interactions, that is, consultations with other members of the group. Or each member of the group may receive information by learning the results of other individuals' activity. The individual and/or the group where individual is a member, may not choose rewards without fully knowing with whom they will interact and what would be their benefit. Instead of a fixed network, individuals are now unsure about the network that will be in place in the future, but have some idea of the number of interactions that they will have. To fix ideas, the individual and/or a group that includes the individual (e.g., as a member) and their expected response data may choose to find reward that may be only useful in interactions with other individuals. For example, the buyer system may determine to be in "purchase" of the product but may wait for additional feature information, say "20% premium recovery", to complete "purchase" of the product. The seller's system may determine to be in "incomplete" information to increase "confidence" of purchase for buyer's system decision.

At 930, introduction of a new signal data, or action data or expected response data as a new cell, C, with a local counter variable $\tau_C$ and since the cells are slightly moving around, more recent signals may be weighted stronger than previous ones. An adaptation step may be formulated as stated earlier in 918. Here the main characteristic of the model could be that several adaptation steps may sometimes be followed by a single insertion. One may note the following feedback relation between the two types of action: a) every adaptation step may increase the signal, action and response counters of the best-matching unit and thereby increases the chance that another cell will be inserted near this cell; b) insertion near a cell C decreases both the size of its Voronoi field $F_C$ and the value of the signal or action or expected response counter. The reduction of the Voronoi field makes it less probable that C will be best-matching unit for future input signals. For example, the buyer's system may receive new feature information from a trusted group or friend in the buyer-seller-trader network, say the "future value" as 20% premium recovery, at "purchase" for decision. At the same time, the seller's system may confirm the "future value" to increase the "confidence" of purchase for buyer's system decision.

Figure 10:
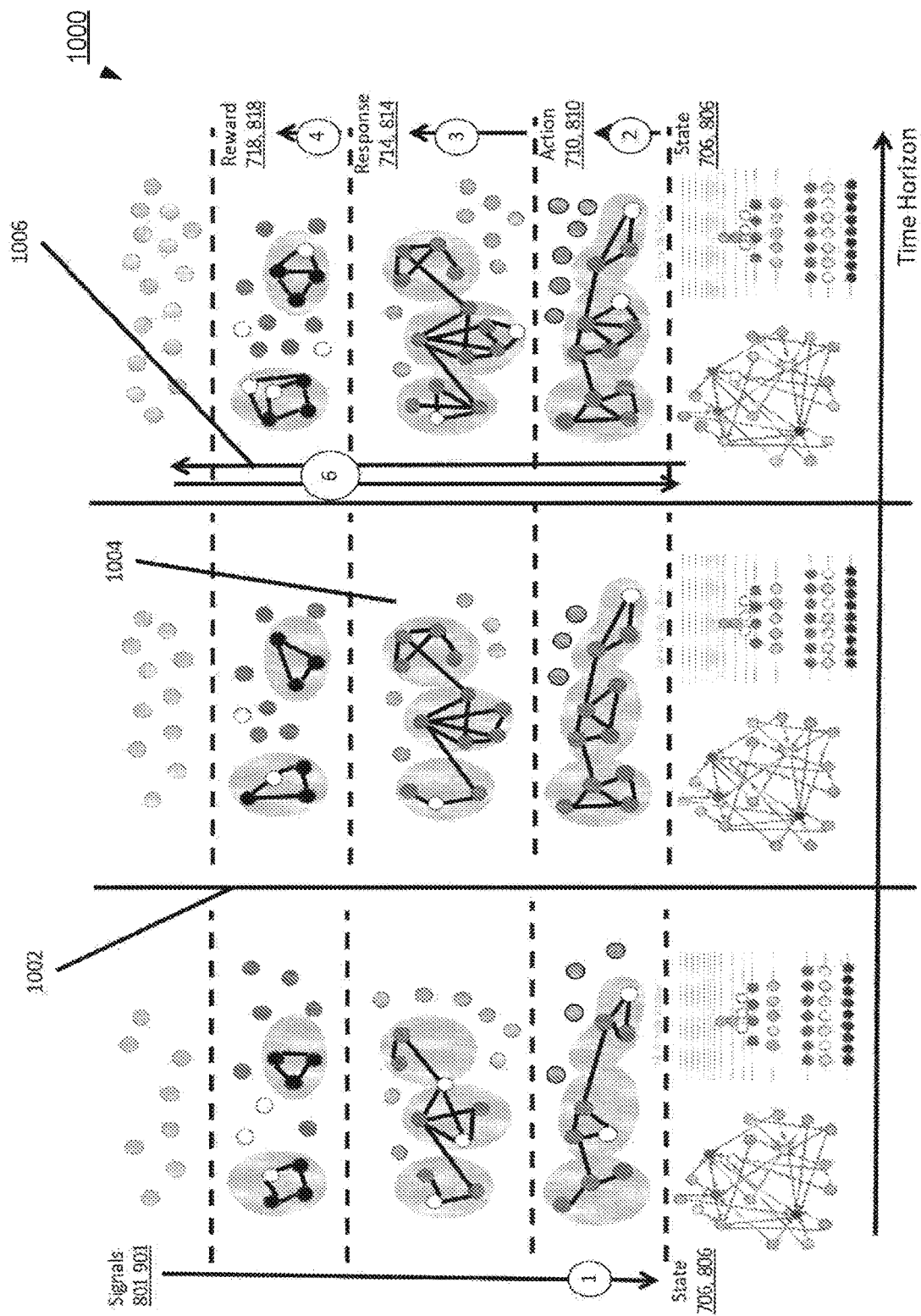
FIG. 10 illustrates evolution of SCANN learning method, in accordance with an embodiment of the present subject matter.

FIG. 10 illustrates evolution of SCANN learning method 1000 (hereinafter referred to as method 1000), in accordance with an embodiment of the present subject matter. The method 1000 may be executed by the data analysis system 500 of the evolution of SCANN learning method and the learning maturity on arranging information that changes overtime in determining unaided cue-set based on a cognitive structure for the individual. At 1002, as time progresses, the dynamic or active workspace data that "wait" 916, 920, and 928 in different layers in FIG. 9, may change and find connections. In addition, the new cell data 918, 924, and 930 in different layers in FIG. 9, may change or reduce and find connections. For example, the buyer's system in a buyer-seller-trader network at the launch/early-stage of the product may wait for much information including product features, reviews, usage, experience, etc. to form a cognitive opinion or impression about the product.

As time progresses, for example, the parameters in rules associated with active experience or historical (or neither) may change and/or be eliminated, and thereby change prediction and prescription that determine the action data for the action indicator 520. As time progresses, at each step of determining the state data, the action data, the expected response data, and the reward data also change optimal controls for the individual and groups. The Voronoi region $F_C$ described earlier with respect to method 900, for example, by an n-dimensional hypercube with a side length equal to the mean length $F_C$ of the edges emanating from C with $I_c$ computed by $I_c = 1/_{card(N_c)} \Sigma_{i \in Nc} \|w_C - w_i\|$. For example, the buyer's system in a buyer-seller-trader network over time may learn many product information including product features, reviews, usage, experience, etc. to determine a cognitive opinion or impression about the product.

At 1004, as time progresses, the inference deducer 516, the latent learner 512, and the probability determiner 510 may autonomously change dimensionalities and therefore apply different techniques such as TA, EA, UA, DBN, SVM, EQG, QSM and QDT for different EPE for the individual and the group. From the above 900, it could be evident that it would be very helpful to know the true dimensionality of the data, meaning the smallest dimensionality t, such, that a t-dimensional sub-manifold of V may be found containing all (or most) input data. Then t-dimensional hyper-cubes may be used to estimate the size of the Voronoi regions. However, to figure out the value of t, especially because the mentioned sub-manifold may not have to be linear but could be randomly twisted. Therefore, even analyses of the signal, state, expected response and reward data may not, in general, reveal their true dimensionality and remain "unaided", but gives only (or at least) an upper bound. However, the method may train machine learn and, therefore, may give some general rules for choosing such an estimate that do work well for all activities that may be encountered subsequently. For example, the buyer's system, in a buyer-seller-trader network, over time may learn product information to determine a strong cognitive opinion on one more features of the product, say "premium quality", as top-of mind that the buyer's system recalls, as 'conscious competence', without any aid, i.e., unaided, of internal or external input.

At 1006, as time progresses, the inference deducer 516, the latent learner 512, and probability determiner 510 may accelerate or decelerate the speed of information flow between signal and state and action, and expected response and rewards. Therefore, may apply different techniques such as TA, EA, UA, DBN, SVM, EQG, QSM and QDT for different EPE for individuals and group. This may support the two structural update operations: a) insertion of a cell, as a neuron; b) deletion of a cell, as a neuron. These operations may be performed such that the resulting structure consists exclusively of multi-dimensional structure $\mathcal{H}$. Although such a data structure may already be sufficient in this example, a considerable search effort may be needed to make consistent update operations. The removal of a cell may require that also other neurons and connections may be removed to make the structure consistent again. Simple heuristics as, for example, to remove a node remove all neighboring connections and the node itself may not work properly. For this purpose, a tracking mechanism of all the $\mathcal{H}$ may be introduced in the current network. Technically, a new data type simplex may be created, an instance of which contains the set of all nodes belonging to a certain $\mathcal{H}$. Furthermore, with every node associated to the set of those $\mathcal{H}$ the node may be part of. The two update operations can now be formulated as: a) a new node r may be inserted by splitting an existing edge qf. The node r may be connected with q, f, and with all common neighbors of q and f. Each $\mathcal{H}$ containing both q and f (in other words, the edge being split) may be replaced by two $\mathcal{H}$ each containing the same set of nodes as $\mathcal{H}$ except that q respectively f may be replaced by the new node r. Finally, the original edge qf may be removed. The new $\mathcal{H}$ may be inserted in the sets associated with their participating nodes, b) to delete a node, it may be necessary and sufficient to delete all $\mathcal{H}$ the node may be part of. This may be done by removing the $\mathcal{H}$ from the sets associated with their nodes. The same may be done with nodes having no more edges. This strategy may lead to structures with every edge belonging to at least one $\mathcal{H}$ and every node to at least one edge. Therefore, the resulting k-dimensional $\mathcal{H}$ structures may be consistent, that is, contain only k-dimensional $\mathcal{H}$. For example, the buyer's system, in a buyer-seller-trader network, over time may learn product information to become expert in determining a strong cognitive opinion on one more features of the product, say "environment" and "quality", as top-of mind that the buyer's system recalls faster, as 'unconscious competence', without any aid, i.e., unaided, of internal or external input.

Figure 11:
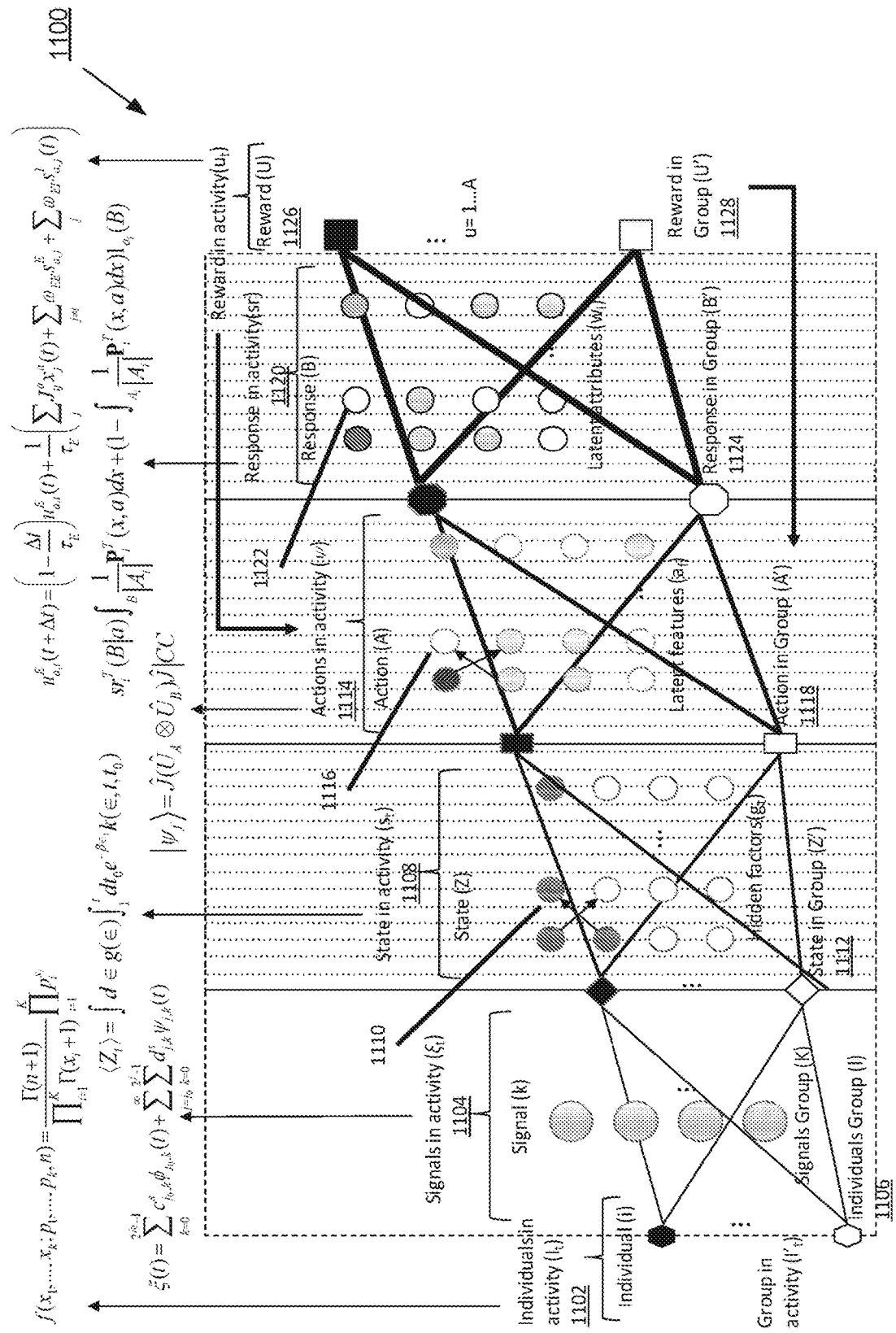
FIG. 11 illustrates an optimization method of multiple-layered multi-dimensional dynamic expansion and contraction of SCANN structure, in accordance with an embodiment of the present subject matter.

FIG. 11 illustrates an optimization method 1100 of multiple-layered multi-dimensional dynamic expansion and contraction of SCANN structure, in accordance with an embodiment of the present subject matter. At 1102, the individual activity content, as structured in the communicator 514, may be optimized with methods including but not limited to parallel programming dynamic programming, and branch and bound combinatorial optimization, stochastic gradient descent, quasi-newton, etc. to minimize statistical errors. A general framework for sensor-based activity recognition, based on a set of attributes and features in each activity content are trained to set autonomously based historical data. Examples of the attributes are described above and may also include a decision or a preference. A relational clique c∈c may be constructed of a clique over all activities at various locations on a trajectory, which may be an activity of one or more individuals. Each clique C may be associated with a potential function $ø_c(v_c)$ that maps a tuple (values of decisions or aggregations).

The manner in which directed cliques bind together may be represented geometrically. When directed cliques bind appropriately by sharing cells, as neurons, and without forming a larger clique due to missing connections, they form cavities ("gaps," "unknowns") in this geometric representation, with high-dimensional cavities forming when high-dimensional (large) cliques bind together. Directed cliques describe the flow of information in the network at the local level, while cavities provide a global measure of information flow in the whole network. These evolutionary structures may establish a relationship between the structural graph and the emergent flow of information in response to activity content, as captured over time of functional graphs. The activity content and likelihood of (K−1) dimensional simplex $S_k$ in the network structure may find multi-nominal distribution, which could be denoted as Mult($p_1$, $p_K$; n), in a discrete distribution over K dimensional non-negative integer vectors x∈ $\mathbb{Z}_+^K$ where $\Sigma_{i=1}^K x_i$=n. Here, p=($p_1$; ... ; $p_K$) is an element of $S_k$ and n>1. Together they may provide a) activity-content, b) probability mass function as expressed, $$f(x_1, \ldots, x_K; p_1, \ldots p_k, n) = \frac{\Gamma(n+1)}{\prod_{i=1}^k \Gamma(x_i+1)} \prod_{i=1}^K p_i^{x_i}$$

to optimize activity content for the individual with minimized errors. For example, the buyer's system in a buyer-seller-trader network optimizes the product information workspace that may wait for additional information to formalize specific rules, say "predict", and minimize errors.

At 1104, any new or update on activity content may initiate signals in activity, which may form the maximum likelihood estimate of the signal and noise (e.g., data not of immediate relevance) for imperfect or incomplete information condition parameters may train machine to learn as a signal, as well as the maximum likelihood estimate of the noise parameters may be trained to be learned as noise. The ratio of these two quantities may be taken and compared with upper and lower thresholds until a decision may be made, based on two properties desirable in a continuous sequential detection which have no analogue in fixed-sample detection, or even in sequential detection, and optimized content as in $\zeta(t)=\Sigma_{k=0}^{2^{j_0}-1} c_{j_0,k}{}^s \phi_{j_0,k}(t)+\Sigma_{j=j_0}^{\infty}\Sigma_{k=0}^{2^{j-1}} d_{j,k}{}^s \psi_{j,k}(t)$. First, the likelihood ratio could be a continuous function of the length of the observation interval for fixed parameter estimates; second, the maximum-likelihood estimates could also be continuous functions of the observation interval. For example, the buyer's system in a buyer-seller-trader network optimizes the product information workspace to "predict" a specific signal, say price, predict maximum likelihood of predicted price and minimize errors to formalize specific rules and optimal policies for prediction.

At 1106, the each individual signal data, as quantum candidate, are aggregated into groups as a function of one or more of attributes and features including time, location, transition and constraints. The grouping may include an aggregation of each individual's decisions into groups. For example, sheafing or other grouping methods may be used for the aggregation into groups for systematically tracking each individual's signal data, with various attributes and features, attached (or glued) to open sets of a topological space. We fix a set $\wedge$ of values for a latent variable. A latent-variable model h over $\wedge$ assigns, for each $\lambda \in \wedge$ and $C \in \mathcal{M}$, a distribution $h_C^\lambda \in \mathcal{D}_\mathcal{R} \varepsilon(C)$. It also assigns a distribution $h_\wedge \in \mathcal{D}_\mathcal{R}(\wedge)$ on the latent variables. This may obtain the map $\varepsilon(X) \to \Pi_{C \in \mathcal{M}}, \mathcal{P}(\varepsilon(C))$. We may use the isomorphism $\Pi_{i \in I} \mathcal{P}(X_i) \cong \mathcal{P}(\coprod_{i \in I} X_i)$ which may take the limit of the cohomology groups of the neural network system as $H^0(\{U_i \to U\}, F)=\ker (\text{Hom}(_i \oplus Z_{U_i}, F) \rightrightarrows \text{Hom}(_{i,j} \oplus Z_{U_{ij}}, F)=\text{Hom}(Z_{\{U_i-U\}}, F)$. The groups determined by grouping methods may use prediction activities and optimization of content operation for the groups. Based on the predictions for the group, an optimal set of choices may be determined for a group. For example, if the individual is part of a group determined to be shopping at a particular location, an optimal set of choices for the individual in the group or sub-group may be based on the number of individuals in the group or sub-group, etc. Also, signal content may be delivered to the individual which may indicate capacity and choices for product options. For example, the buyer's system in a buyer-seller-trader network optimizes the product information workspace for the aggregated group to "predict" price of nearest-neighbor, predict maximum likelihood of predicted price of the nearest-neighbor and minimize errors to formalize specific rules and optimal policies for prediction.

At 1108, the each optimized individual signal content 1104, as quantum candidate, may use methods as described above 1102 to optimize for the state data for the choice of unaided cue-set on activity of the individual.

At 1110 is an abstraction of dynamic and active workspace, as a layer, created for each optimized signal data including "wait" data and "new cell" data. As explained above, parallel connections between any cliques and cavities, as sigma cell in the layer (I) and the output of any data, as neuron, in the layer (I−1) may be generated. The number of these parallel connections is equal to the number of activation functions in the layer (I). Therefore, in the layer (I) an activation function along with all sigma cells or equivalently the sigma block are considered as a single multi-dimensional data or neuron, as shown by dashed line in FIG. 11. For each of these connections, local gradient may be computed as the product of the error signal and partial derivatives of each of the activation functions in the layer (I) with respect to its state content variables. In this optimization of the multi-objective state content including constraints, a state data, as a neuron, may also be considered in the last layer for each of the constraint functions; as in this example, by means of the method, only the definition of the error signal may be modified. For example, the buyer's system in a buyer-seller-trader network optimizes the product state information workspace to "predict" a specific state, say "pre-purchase search" state, predict maximum likelihood of predicted "pre-purchase search" state and minimize errors to formalize specific rules and policies for prediction.

At 1112, each optimized individual state data, as quantum candidate, may use methods as described above for grouping into a group or network of the action data for the group.

At 1114, each optimized state data, as quantum candidate, may use methods as described above to optimize the action data for the choice of unaided cue-set on activity of the individual.

At 1116, an abstraction of dynamic and active workspace, as layer, created for each optimized state data may use methods or other methods as described above for the choice of unaided cue-set on activity of the individual.

At 1118, each optimized individual action data, as quantum candidate, may use methods as described above for grouping into a group or network of the action data for the group.

At 1120, each optimized action data, as quantum candidate, may use methods as described above to optimize the expected response data for the choice of unaided cue-set on activity of the individual.

At 1122 is an abstraction of dynamic and active workspace, as layer, created for each optimized action data may use methods or other methods as described above for the choice of unaided cue-set on activity of the individual.

At 1124, each optimized expected response data, as quantum candidate, may use methods as described above for grouping into a group or network of the action data for the group.

At 1126, each optimized expected response data, as quantum candidate, may use methods as described above to optimize the reward for the choice of unaided cue-set on activity of the individual.

At 1128, each optimized individual reward data, as quantum candidate, may use methods as described above for grouping into a group or network of the action data for the group.

Figure 12:
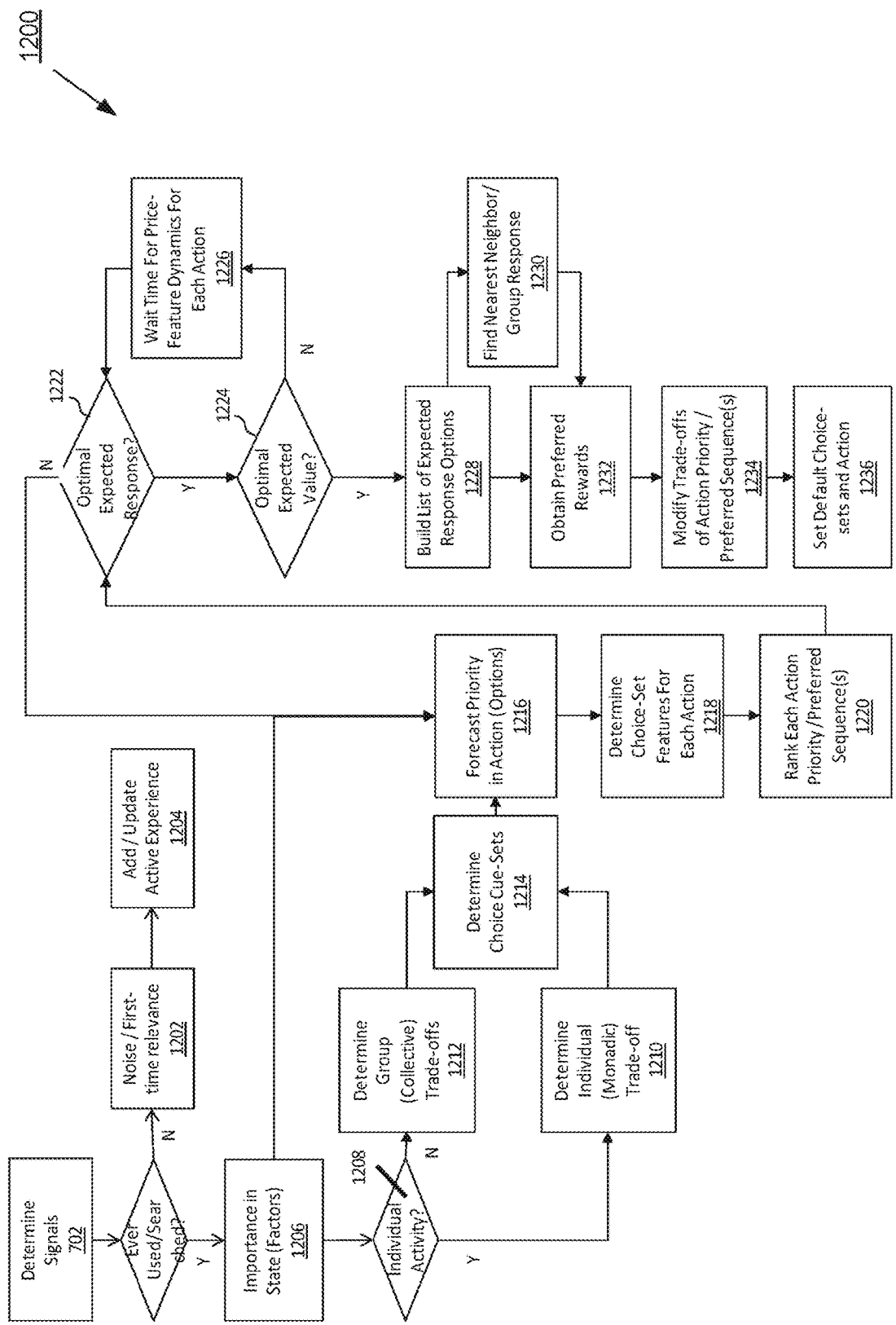
FIG. 12 illustrates a method of ranking/ordering information, in accordance with an embodiment of the present subject matter.

FIG. 12 illustrates a method 1200 of ranking/ordering information, in accordance with an embodiment of the present subject matter. The method 1200 may be executed by the data analysis system 500 for the presentation of the plurality of choices for the individual and the group. The method 1200 may be operable to provide unfiltered data based on location and behavioral information of the individual.

The data analysis system 500 may determine individual and/or group signal data on a particular activity (e.g. trading product of a seller) 1202. The smart card 102 and/or access device 104-1 or 104-2 may detect its current activity with geographic location and send the signal related to activity data to the data analysis system 500. For example, a smart card 102 and/or the access device 104-1 or 104-2 may transmit activity with location information including status information to the data analysis system 500 using the communicator 514. The access device 104-1 or 104-2 may provide activity status information proactively or in response to a request from the data analysis system 500. For example, the buyer's system, in a buyer-seller-trader network, determines a set of features of the product, say "environment", "quality", "price" and "future return" that the buyer's system recalls unaided, as 'unconscious competence', of internal or external input.

The data analysis system 500 may further determine whether the signal of activity is related to any previous activity ever performed or used from the historical data or a fresh new activity which may or may not be relevant to the individual or the group 1202. This determination may be based on the current activity with location of the smart card 102 and the access device 104-1 or 104-2, the prior state of the device and other behavioral information preferred by the individual for the cue card.

The data analysis system 500 may add or update an active experience workspace, as in a layer to make connections with other related individual or group activities (e.g., announcing product feature details in an exchange to get buyer) 1204. If only from historical trading, the system may present importance in state attributes and features for selection 1206. For example, the buyer's system, in a buyer-seller-trader network, determines as in "purchase" cognitive state with a set of feature choices of the product, say "environment", "quality", "price" and "future return" that the buyer's system recalls unaided, as 'unconscious competence', of internal or external input.

If another individual initiates the same activity 1208, the system may further provide trade-off utilities of the individual available (e.g. the buyer's system of the product may require higher quality-price trade-off). Otherwise, the data analysis system 500 may initiate trade-offs at the group (or community) level, where the individual is a member, to the smart card 102 associated with the access device 104-1 or 104-2 for user selection (1212). The trade-off conditions may be determined as associated with the target activity at target location, (e.g., trade-off conditions published by a different products) or other entity that is associated with the target activity at location. The method 1200 of FIG. 12 may be repeated as the activity of the individual and/or group changes. For example, the buyer's system, in a buyer-seller-trader network, in "purchase" cognitive state with a set of feature choices of the product, trade-off "quality" over "price", "environment" and "future return" that the buyer's system recalls unaided, as 'unconscious competence', of internal or external input.

The data analysis system 500 may determine the choice unaided cue-set and track the current activity and action of the individual smart card 102 and access device (1214). The determination may be made, for example, as a result of received confirmation or due to the decisions made at steps 1210 and 1212. The data analysis system 500 may be trained further forecast likely action options and their priority levels for each action to which associated activity state data may be made available (1212), as has been previously discussed.

The data analysis system 500 may further be trained to determine a list of choice-set features for each action for the next activity or event to be performed by the individual using the smart card 102, based on the current activity of the smart card 102, its activity content, location and behavioral data for the smart card (1216). The different options may be targeted by one or more targeting methods. The list of options may be supplemented with trade-offs about each option, which can be related to the current and/or next activity (e.g., the product may be related to the commodity options, such as the estimated time of delivery, shipping, and the like).

Furthermore, the inference deducer 516 and the probability determiner 510 may use various optimization methods, as described above 1100 to identify the preferred sequence of the plurality of choices 1220 for the individual and/or group, based on aggregate data at a group or sub-group level of individual cue card performing similar activities in the same or proximate location. For example, the buyer's system, in a buyer-seller-trader network, in "purchase" cognitive state with a set of feature choices of the product, with prefer sequence order of a) "quality" b) "price" c) "environment" and d) "future return" that the buyer's system recalls unaided, as 'unconscious competence', of internal or external input.

The data analysis system 500 may further determine if the action pertaining to a choice is optimal for the expected response (e.g., expected response of asset buyer in value terms is not adequate) (1222). If not, the data analysis system 500 may go back to operation 1216 and continue to forecast off the action options as previously discussed. If yes, however, the system may continue on to determine the rewards on expected response are also optimal (1224).

If the expected response and reward are not optimal, the data analysis system 500 may determine additional price-feature dynamic forecasts for a future period based on likely values and benefits of the activity (1226). Otherwise, if the expected response and reward are optimal, the data analysis system 500 may continue to build the list of expected response options (1228).

The data analysis system 500 may further simultaneously, if not sequentially, determine aggregated expected response for the group and may determine the expected response of the nearest neighbor's expected response (1230). The inference deducer 516 and the probability determiner 510 may use grouping methods, as described above, to find nearest neighbor's expected response and optimal policies for a future period based on likely action on the activity content of the individuals in smart card 102 and the access device 104-1 or 104-2. For example, the buyer's system, in a buyer-seller-trader network, in "purchase" cognitive state with a set of feature choices of the product, revises a preferred sequence order after expected response as a) "price" b) "quality" c) "future return" and d) "environment" that the buyer's system recalls unaided, as 'unconscious competence', of internal or external input.

The data analysis system 500 may further determine the preference of the individual on reward based on historical actions and/or state attributes and features in latent variables, of the individual and group where the individual is a member (1232). The data analysis system 500 may provide the preference reward of the individual and the list of options to the smart card 102, for user selection.

The data analysis system 500 may further determine when the individual as well as group preference regarding a reward on an activity of the unfiltered data is modified in the smart card (1234). This modification may be made with relation to priority and/or preferences in action-expected response-reward trade-offs. The data analysis system 500 may receive the selection of a modified action including priority, importance and preferences on the activity of the access device 104-1 or 104-2 from the smart card 102 (e.g., the seller chooses to delay based on the buyer's expected response and immediate reward vis-à-vis future reward) by the individual within an additional expected response and/or response of nearest neighbor option for an activity. For example, the buyer's system, in a buyer-seller-trader network, in "purchase" cognitive state with a set of feature choices of the product, revises prefer sequence order after analyses of expected immediate and future reward as a) "future return" b) "quality" c) "price" and d) "environment" in that order that the buyer's system recalls unaided, as 'unconscious competence', of internal or external input.

The data analysis system 500 may further determine the list of actions with reward options as related to activity content attributes and features of the activity in smart card 102 as well as the access device 104-1 or 104-2 in relation to other actions with reward options and set these and other selected options as a default rank/order of consumption options for the household (1236). This default rank/order of options may be sent to the smart card 102 and made available to the access device 104-1 or 104-2 and the communicator 514. The data analysis system 500 may maintain and monitor the activities of the smart card, so that any deviation from the default choice set may be flagged and sent as an "alert" to the cue card as well notified at the group level.

Distribution of an activity action data attribute and features may include making the activity action data attribute and features accessible to smart card 102 and the access device 104-1 or 104-2. This may be performed in any suitable way 800. In certain embodiments, when a prediction and/or prescription is determined, a copy of a neighboring activity action data attribute and features may be automatically provided (e.g., block-chain) to the smart card 102 and the access device 104-1 or 104-2. In another embodiment, to access a activity action data attribute and features, option selection data may be stored and updated for a cue card with appropriate permissions settings and/or with links to appropriate decision-making probabilities on action attributes and features. For example, a link to an action attribute and features associated with a target seller's asset location may be inserted into a trading profile associated with a cue card in order to make the action attribute and features accessible to the smart card 102 and/or the access device 104-1 or 104-2 associated with the individual activity.

The data analysis system 500 may further configure action attributes and features to provide notifications to one or more cue card and/or access devices indicating that published action has been made accessible. For example, the data analysis system 500 may provide a notification to the access device 104-1 or 104-2 indicating that the action attribute and features associated with a seller's asset location may be made accessible to the access device 104-1 or 104-2. The notification may include information associated with the action attribute, including a description provided as a cue end-state for the individual activity, a geographic location or any other data associated with the action attribute and features.

The access device 104-1 or 104-2 may receive the notification, and the device may elect whether to retrieve the accessible action attribute and features. In some embodiments, current activity proximity to the geographic location may be requisite for accessibility to the associated action attribute and features and in other embodiments, once accessibility to action is granted, accessibility is maintained for a predefined length of time, such as a day, week, month, or indefinitely. Accordingly, the individual cue card may have access to action associated with a geographic location based on past or present detected proximity of the access device 104-1 or 104-2 to the geographic location.

FIGS. 13-17 illustrates screen shots of a smart card, such as the smart card 102 in accordance with an embodiment of the present subject matter. The screen shots illustrate that the individual's choices and preferences and other information may be entered and that the information may be sent to the data analysis system 106 and used for predictions. For example, an individual may use the smart card 102 to provide behavioral information related to service and mode of operation, and that information may be transmitted to the data analysis system 106 or other access devices.

Figure 13:
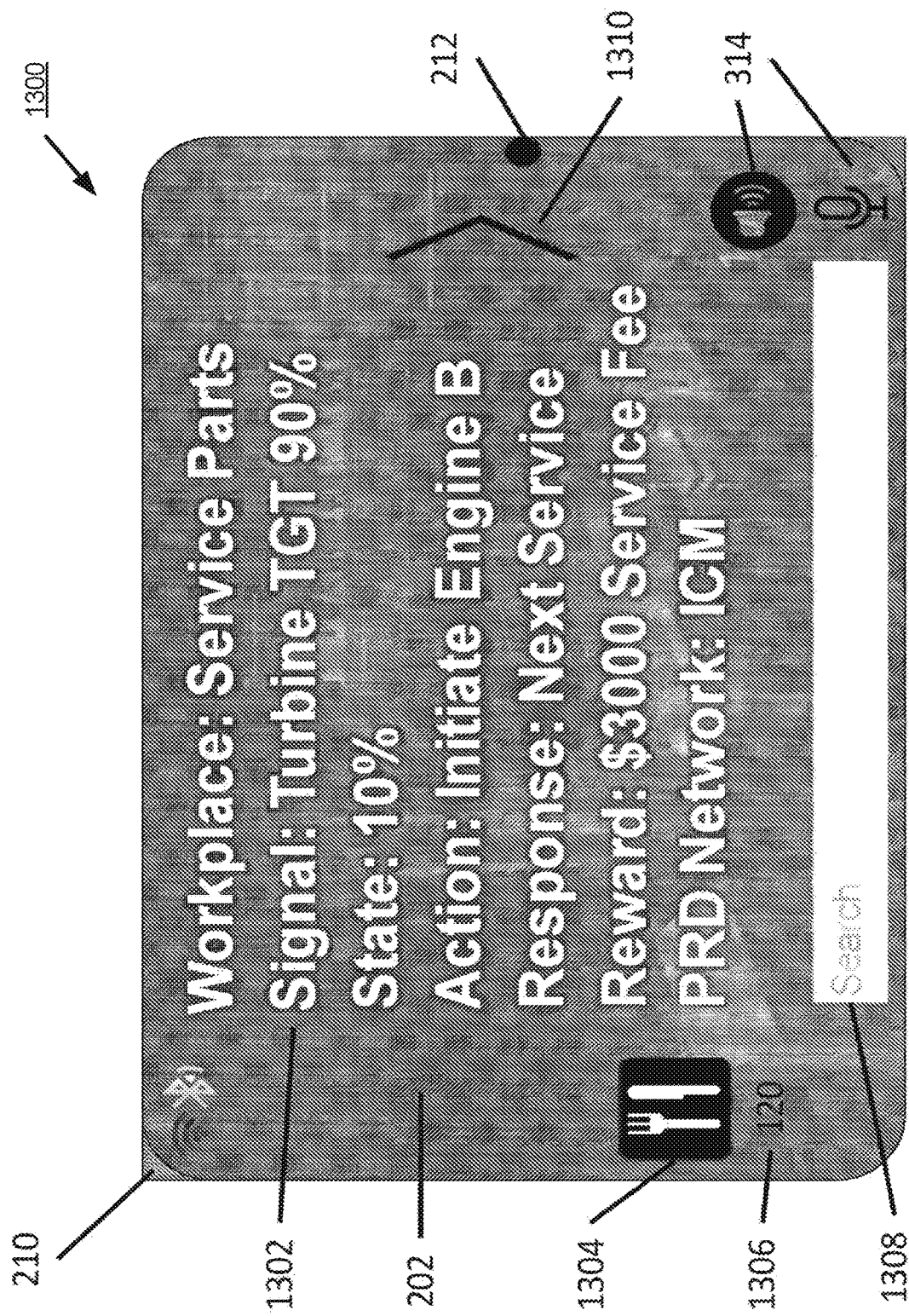
FIGS. 13-17 illustrates screen shots of a smart card, in accordance with an embodiment of the present subject matter.

FIG. 13 depicts a smart card 1300 presenting a data set 1302. In an example, the data set 1302 includes a plurality of choices for the individual having the smart card 1300. For instance, the plurality of choices may include information about a next activity 1304 and a remaining time 1306. In an implementation, the plurality of choices may be determined from historical data and may be presented via slide screen view 1308. In an example, the data analysis system 500 may determine an activity of the plurality of choices from a location sensor provided in the smart card 1300. The plurality of choices may be predicted and confirmed. For example, a plurality of choices may be sent to the smart card 1300 to request that the individual confirm the current activity or location and confirm a target location or next activity of the individual.

FIG. 13 also shows that transactional data in addition to location may be determined by the smart card 1300. For example, time, weather, etc., may be sent along with activity associated with location and a user ID for the individual to the data analysis system 100. FIG. 13 also shows that search data 1310 in addition to unfiltered data may be determined by the smart card. For example, previous history, product specifications, etc., may be sent along with activity associated with location for the individual to the data analysis system 100.

Figure 14:
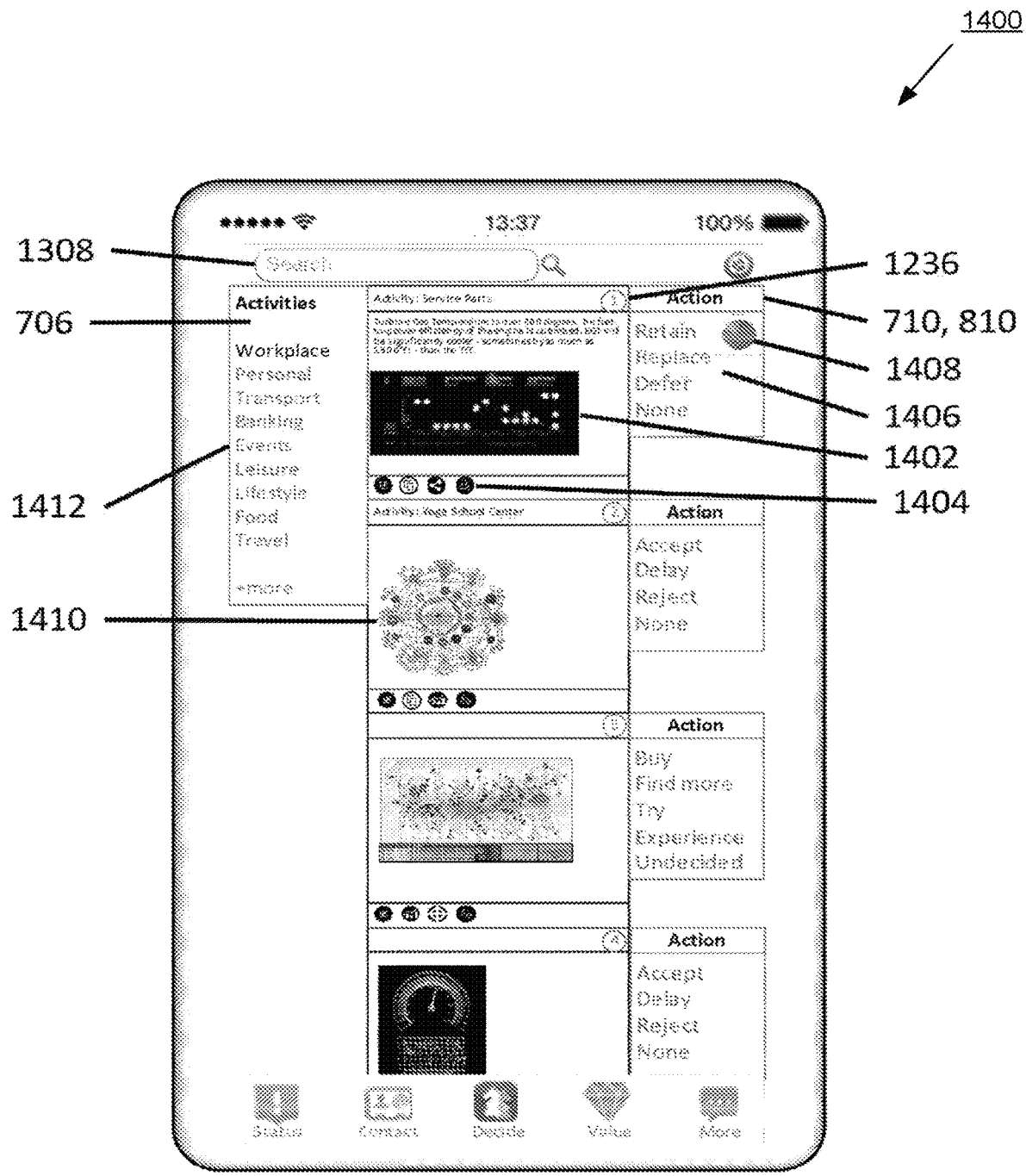

FIG. 14 shows that list view of an unfiltered data that may be ranked/ordered by the individual and may be selected by the individual. This information may be predicted by the data analysis system 500 and unfiltered data may be generated to request confirmation of the predictions and prescriptions. For example, the data analysis system 500 may predict that the individual is checking a service engine at workplace and the screen may display a failed part 1402 and the user may confirm "replace" or indicate a different mode as an action 1404 and thereby expected response and rewards are generated. This also shows a group's unfiltered data as well as nearest neighbor of action options 1406 and individuals, in number or name or other methods, 1408 used actions for the activity in other occasions and/or situations. The data analysis system 500 may use graph, text, audio, video and other methods to render group's actions options and unaided cue-set. The data analysis system 500 may also declare the action of similar activities in other groups, when the individual is at a current activity (e.g., servicing engine in the workplace) 1402 and the individual's next activity (e.g., attending Yoga school) 1408. The unfiltered data may be based on rank/order 1300 and/or previous user settings and/or may be predicted from historical data.

The data analysis system 500 may associate the smart card content with location data and other information. For example, the smart card may be used to create content using an access device 104-1 or 104-2, and the geographic location of the access device at the time that the smart card content created is used to create a "geo-tag" that is associated with the content. In this or similar manner, the cue card may associate other information with content, including, but not limited to, timestamps (e.g., the time and/or date when the content was created), individual identifiers (e.g., an identifier for the individual associated with the access device and/or who created the content), and content descriptions or type identifiers (e.g., a photograph content-type identifier). This other information, once associated with the cue card content, may be referred to as "other tag" data. Geo-tag data and/or other tag data associated with content may be utilized for selective retrieval and distribution.

The smart card content may provide the individual of an access device with a capability of varieties of activity including but limited to activating, creating, publishing, enabling, accessing a content at a specific location within the network. As an example, the individual with a cue card may be physically located at a workplace particular geographic location within the activity 1410. The individual may utilize the cue card to create content, such as searching for a nearest restaurant. Content (e.g., an image file of a restaurant) is already stored in the data storage of the data analysis system 500. The smart card recognize an activity content creation event and instruct the data analysis system 500 to detect the geographic location of the action on the unfiltered data. The data analysis system 500 may detect the geographic location and provide location data, i.e., geo-tag data, representing the detected geographic location of the access device. The smart card target activity content associates the location with the content and provides the content, associated geo-tag data, and optionally other associated tag data to the data analysis system 500.

Figure 15:
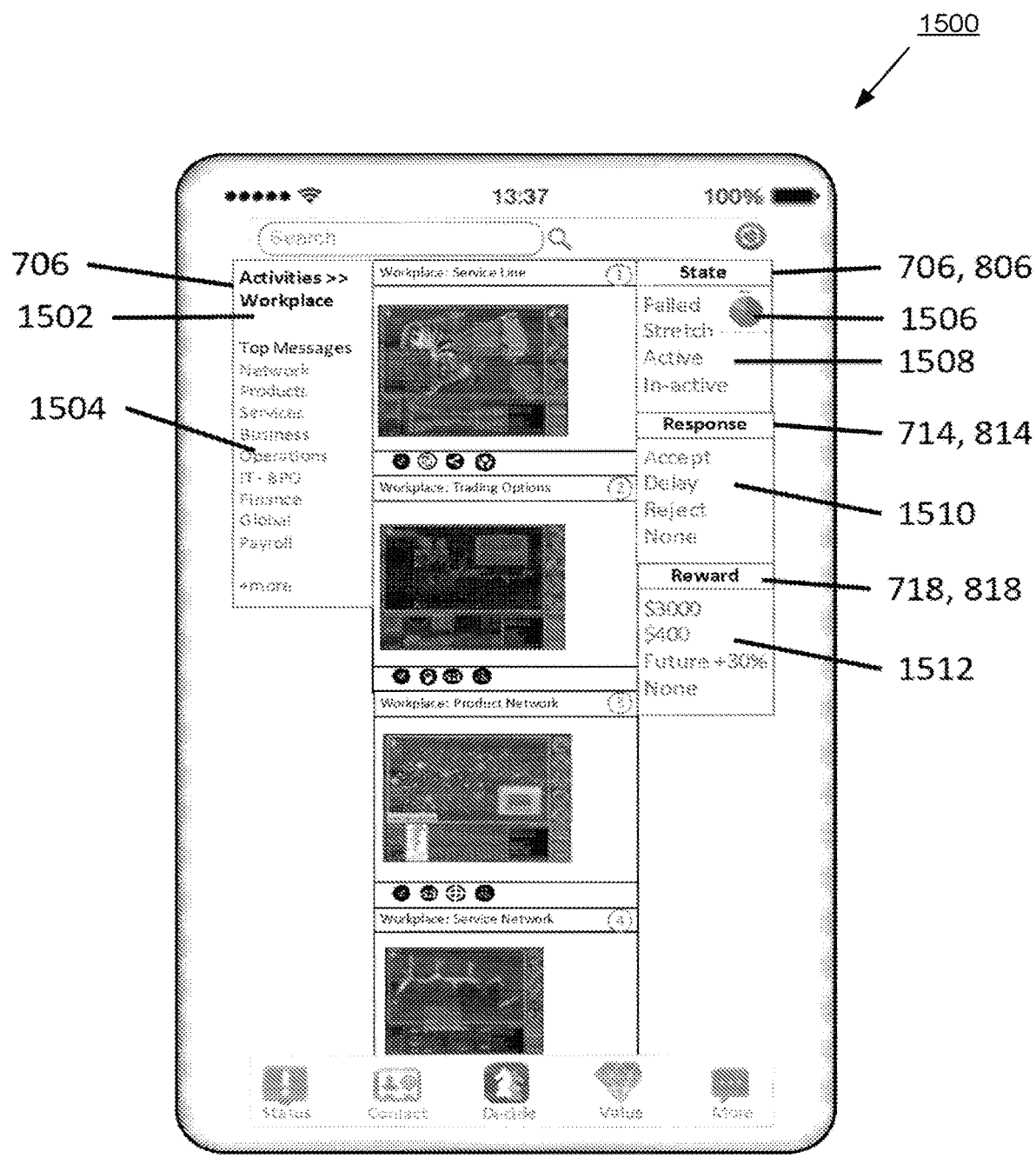

FIG. 15 illustrates an example of a screen shot of exemplary unfiltered data content representation 1502 between data records associated with the state data 1504, state attributes and features 1506, expected response 1508 and reward 1510. The unaided cue-set data may include target unaided cue-set content and activity data, and geo-tag data may include target geo-tags. The content instances may represent content respectively associated with target geographic locations 1512. For example, unfiltered data 1502 may correspond to the illustrated service workshop. The location of each service activity content 1504 may be provided based on proximity to the target unaided cue-set shown in FIG. 12 The unaided cue-set may be configured to utilize data included in the cue card content representation 1502 to search for and identify matching activity data.

The unfiltered data may be provided for the individual to experience the activity content and individuals may annotate the content in some instances. For example, the cue card may receive a notification of a cue card content instance having been made accessible to the cue card based on a detected target activity location. The individual may choose to experience the content. In addition, the individual may make one or more annotations to the cue card content instance for an activity instance, including, but not limited to, providing the cue card content instance for a specific activity instance (e.g., "The price comparison at shopping malls!"), review of the cue card content instance (e.g., nearest neighbor action at shopping malls), editing the content instance, blocking the content from being made accessible to the access device and/or the individual, and reporting the content instance (e.g., as including inappropriate or distasteful material). The access device may provide the annotation to the data analysis system 500. The annotation may be added to other tag data associated with the cue card content instance. Accordingly, annotations may be used to index, search, and retrieve the content instance for activity instance. For example, the individual may search accessible content for specific content instances having a particular rating, associated with a particular creator, created during a particular time range, having associated comments, etc.

The data analysis system 500 may be configured to enable individuals' cue cards to communicate with one another in connection with a target geographic location. For example, at a location for an activity content instance, the individual may establish and participate in follow-up communications with one another. Such follow-up communications may be hosted and made accessible to the involved individual, and in some instances, such communications are made accessible exclusively to the involved individuals.

Figure 16:
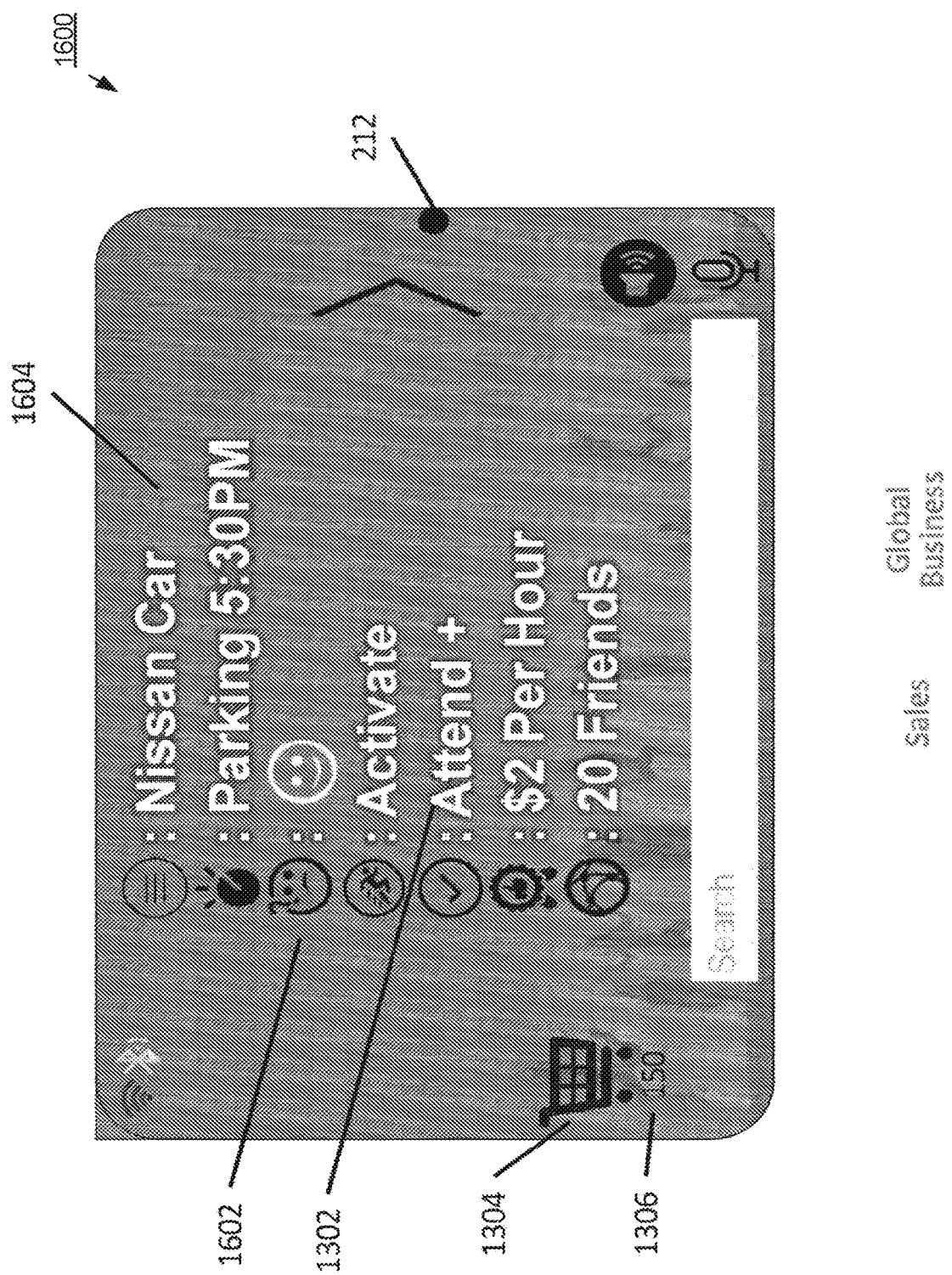

FIG. 16 show screenshots for a smart card of exemplary unfiltered data content representation 1602. The individual may utilize the cue card to post content and retrieve and experience content based on target locations. FIG. 16 shows that the individual may experience content and annotate the content. In an example, the individual may be in a particular state 1602 in between locations along an activity and the detected content location may qualify the individual for access to content. The individual may elect to utilize additional access devices (e.g., car activation in a parking lot) to retrieve and experience activity content. Accordingly, after an activity, from one location to another, the individual may access additional access activity content instances, cue card may thread and sensor communications to retrieve, experience, and annotate content that has been made accessible.

The data analysis system 500 may use dynamic context to determine a plurality of choices. Dynamic context takes into consideration the individual's direction and speed-gap to generate timely choice of the unaided cue-set. Speed gap distribution analysis may be performed by the data analysis system 500 to determine the distance between individuals in an activity as they move toward an activity location. For example, one individual is jogging at a particular speed and another individual is moving at another speed on an activity, and the gap between these two is the speed gap.

Figure 17:
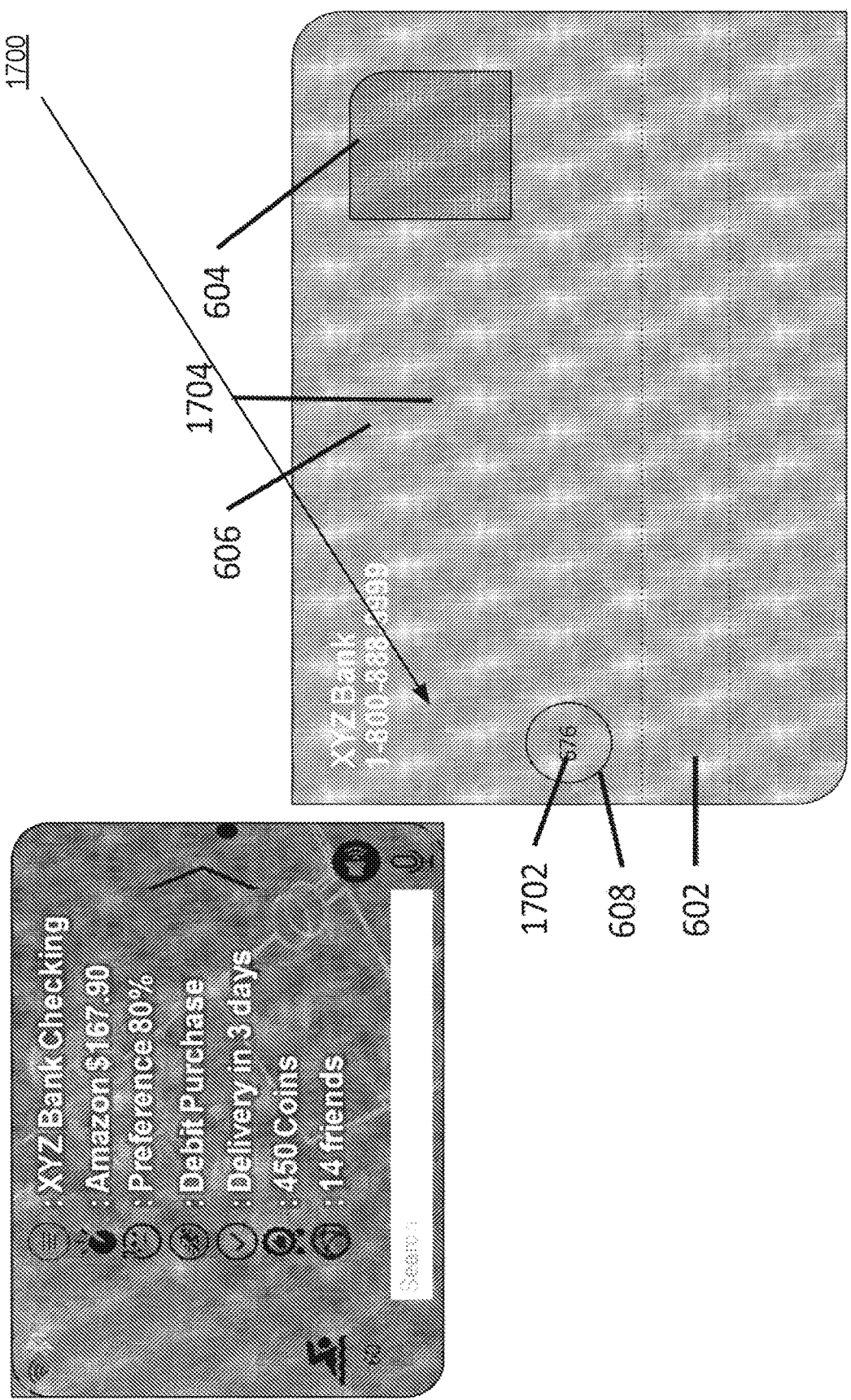

FIG. 17 shows the screenshot of the back-panel of a smart card of exemplary unfiltered data content representation 1702 including content related to identity, anonymity and access, etc. The panel may also contain one or more sensors 1704 for use such as, but not limited to, gesture, digital signature, 5 touch, biometrics, etc. or other identity verification methods that the individual may require for various activity or access to the content of access device.

While the embodiments have been described with reference to examples, those skilled in the art will be able to make various modifications to the described embodiments without departing from the scope of the claimed 10 embodiments. Furthermore, the smart card and data analysis system is generally described with respect to autonomously using proactive-retroactive learning method with self-organized cognitive algebraic neural network SCANN learning for arranging, forecasting (predictive), recommending (prescriptive) ranking/ordering information for trading and service activities by way of 15 example. The system may be used for other activities as well, such as for healthcare activities, shopping services, transportation activities, banking activities or for timely providing content as a cue related to any subject matter based on activity, action, response, reward, time and other metrics and constraints.

What is claimed is:

1. A data analysis system comprising:
a processor; a latent learner executable by the processor, the latent learner is to arrange data, using latent causal variables, in a multi-dimensional structure based on a target activity defined by a smart card, wherein the data pertains to activities comprising a current activity and the target activity associated with a smart card; an inference deducer executable by the processor to perform analysis on the data arranged in the multi-dimensional structure to predict an outcome of the target activity, wherein the inference deducer employs a proactive-retroactive learning technique to deduce the outcome based on the latent causal variables; a probability determiner executable by the processor, the probability determiner to determine a probability of success of the outcome that has been predicted; and wherein the processor is further to:
determine, based on the outcome and probability of success, a plurality of choices associated with the activities; determine patterns and changes in the data pertaining to the activities detected by an access device with access to the smart card, perform mapping, transformation, parallel computation, distributed task dispatching, scheduling, and I/O functionalities, exposed through at least one application programming interface for the data pertaining to the activities; communicate with the access device and the smart card over a network; schedule to arrange the plurality of choices and the probability of success of the outcome for the access device to be rendered on the smart card; cue the plurality of choices and the probably of success of the outcome for particular listing on the smart card; and transmit the plurality of choices and the probability of success of the outcome to the access device for rendering on the smart card.

2. The data analysis system of claim 1, further comprising a data receiver executable by the processor, the data receiver to receive the data pertaining to the current activity and the target activity, wherein the data is received from at least one of the smart card or a data source.

3. The data analysis system as claimed in claim 2, wherein the smart card is a first smart card, and wherein the data receiver is further to:
receive data associated with a second smart card; and
transmit, to the first smart card, the data pertaining to an activity associated with the second smart card.

4. The data analysis system of claim 1, wherein the plurality of choices correspond to at least one of a state of an individual that owns the smart card, an action to be taken by the individual, an expected response for the action taken, or a reward for the current activity of the individual.

5. The data analysis system of claim 1, comprising:
a state identifier executable by the processor to determine a state of an individual that owns the smart card based on the outcome and the probability of success of the outcome; an action indicator executable by the processor to indicate an action to be taken based on the state of the individual, a response provider executable by the processor to provide an expected response based on the outcome and the probability of success of the outcome, the response provider to provide the expected response for a group of individuals of which the individual is a member; and a reward identifier executable by the processor to identify a reward to be provided to the individual based on the current activity of the individual.

6. The data analysis system as claimed in claim 5, wherein the action indicator is further to:
determine a cognitive state for each choice based on a plurality of attributes, features, and latent variables associated with the action; and
determine a cognitive state probability based on the cognitive state of the individual performing an activity at a particular time and a set of multi-layered multidimensional optimizing factors.

7. The data analysis system as claimed in claim 5, wherein the action indicator is further to:
model each individual of the group of individuals as a quantum particle based on a time and a location; sheave quantum particles to form subgroups of the group of individuals; and determine a data set containing various choices based on predictions for a subgroup of the group of individuals of which the individual is a member.

8. The data analysis system as claimed in claim 1, further comprising a communicator executable by the processor to:
establish a connection with the smart card as a peer-to-peer network; and establish a communication thread between the smart card and a second smart card within the peer-to-peer network.

9. A method comprising:
receiving, by a processor of a computing device, data pertaining to a current activity, the data comprising a time and a geographic location associated with a plurality of smart cards being used by a plurality of individuals while performing the current activity; arranging, by the processor, the data into a multi-layered multi-dimensional structure based on a self-organized cognitive algebraic neural network (SCANN); extracting incomplete cognitive data from features, attributes, and latent variables that existed in historical activity data associated with the historical transactions, but retained in a Voronoi region of the historical activity data; and
associating, using a Voronoi geometry algorithm, the incomplete cognitive data with features, attributes, and latent variables of the data associated with the current activity to generate a complete set of cognitive data; and
performing, using the complete set of cognitive data, the aggregating the data and the determining the plurality of choices; and aggregating, using SCANN-based learning, the data from each smart card of the plurality of smart cards into multiple groups, wherein the aggregating is based on historical transactions performed by the plurality of individuals using the plurality of smart cards; determining, by using the processor to apply a proactive-retroactive learning technique to the aggregated data, a plurality of choices for an individual of a group of the multiple groups based on the current activity and activity-based predictions for the group, the plurality of choices being associated with actions expected to be performed with respect to the current activity of the individual and with use of a smart card owned by the individual, ranking, by the processor, the plurality of choices in a sequential order based on highest to lowest probability that the individual will choose each respective choice of the plurality of choices; and transmitting, by the computing device via an access device, the plurality of choices for the individual to the smart card to be rendered on the smart card for selection by the individual.

10. The method of claim 9, further comprising:
performing, by an inference deducer executed by the processing device, the proactive-retroactive learning technique on the multi-layered multi-dimensional structure to predict an outcome of the current activity based on latent causal variables of the aggregated data; determining, using a probability determiner executed by the processing device, a probability of success of the outcome that has been predicted; and determining, based on the outcome and probability of success, the plurality of choices associated with the activities.

11. The method as claimed in claim 9, further comprising determining an action taken by the smart card on a choice from the plurality of choices as shared with the individual, wherein the action comprises a cognitive state probability.

12. The method as claimed in claim 11, wherein the determining the action further comprises:
identifying attributes associated with each of the plurality of choices rendered on the smart card;
determining a cognitive state for each of the plurality of choices based on the attributes, features, and variables associated with the plurality of choices; and determining a cognitive state probability, based on the cognitive state and using a set of multi-layered multi-dimensional optimization factors, comprising a probability of the individual being engaged in the action at a particular time.

13. The method as claimed in claim 9, wherein the determining the plurality of choices comprises:
accumulating cognitive states, an expected response, and a reward for the plurality of individuals; modeling each individual from the plurality of individuals as a quantum particle based on an activity, time, and a location of each individual, identifying groups of individuals by sheaving the modeled quantum particles; and determining an order of the plurality of choices based on transactions and predictions for the individual as well as on the predictions for the group of individuals of which the individual is a member.

14. The method as claimed in claim 9, further comprising:
determining actions associated with the plurality of choices based on the historical transactions in asymmetric and incomplete information conditions; and transmitting the plurality of choices to the smart card over a network.

15. The method as claimed in claim 9, wherein the ranking the plurality of choices comprises:
obtaining the data associated with one of the individual or a group of individuals, and which pertains to a particular activity; based on determining whether the data is related to one of a previous activity or a new activity of the individual, making connections with smart cards of other individuals, which are related to a smart card of the individual through the one of the previous activity or the new activity;
based on determining that a new smart card of a new individual has initiated the particular activity, identifying a second plurality of choices associated with the particular activity for the new individual, upon identifying the plurality of choices, forecasting actions associated with each of the plurality of choices; based on the forecasting, ranking the second plurality of choices in a second sequential order; and transmitting the plurality of choices for rendering on the new smart card.

16. A non-transitory computer-readable medium of a first smart card storing instructions, which when executed by a processor, perform operations comprising:
authenticating and securing a connection with one or more second smart cards via one or more access devices that can read data from the one or more second smart cards; negotiating a transaction with the one or more second smart cards, wherein negotiating the transaction generates data associated with historical transaction activities; extracting incomplete cognitive data from features, attributes, and latent variables that existed in historical activity data associated with the historical transactions, but retained in a Voronoi region of the historical activity data; and
associating, using a Voronoi geometry algorithm, the incomplete cognitive data with features, attributes, and latent variables of the data associated with the current activity to generate a complete set of cognitive data; and performing, using the complete set of cognitive data, the aggregating the data and the determining the plurality of choices; and
transmitting the data to a computing device that performs self-organized cognitive algebraic neural network (SCANN)-based learning on the data and generates a plurality of choices associated with a proposed current activity as well as a probability of success of each respective choice of the plurality of choices; receiving the plurality of choices and the probabilities of success; and
displaying the plurality of choices and the probabilities of success through a first display unit of the first smart card for selection by an individual carrying the first smart card.

17. The non-transitory computer-readable medium of claim 16, wherein the operations further comprise:
generating second data associated with execution of a further transaction in response to selection of a choice of the plurality of choices; transmitting the second data to the computing device for further SCANN-based learning; receiving a plurality of updated choices and updated probabilities of success; and displaying the plurality of updated choices and the updated probabilities of success through the first display unit.

18. The non-transitory computer-readable medium of claim 16, wherein the operations further comprise:
providing, to the computing device, security data including a touch identifier of the individual, providing, based on authentication of the security data, a public key to authenticate communication with the one or more second smart cards and the one or more access devices; and verifying an authentication mechanism for performing the authentication via one of a group or a sub-group protocol comprising at least one of Transmission Control Protocol Internet Protocol (TCP/IP), Individual Datagram Protocol (UDP), Simple Mail Transfer Protocol (SMTP), File Transfer Protocol (FTP), Hypertext Transfer Protocol (HTTP), or Dynamic Host Configuration Protocol (DHCP).

19. The non-transitory computer-readable medium of claim 18, wherein the operations further comprise:
in response to successful authentication using the public key, generating a digital signature using or more algebraic structure of an elliptic curve digital signature algorithm; and providing, to the computing device, the digital signature in order to perform identification verification for conducting the proposed current activity with the one or more second smart cards.

\* \* \* \* \*